US012695348B2

(12) United States Patent
Bae et al.

(10) Patent No.: US 12,695,348 B2
(45) Date of Patent: Jul. 28, 2026

(54) STATOR ASSEMBLY, A HAIRPIN WINDING MOTOR INCLUDING THE SAME, AND A METHOD OF WINDING STATOR COIL OF A HAIRPIN WINDING MOTOR

(71) Applicants: HYUNDAI MOTOR COMPANY, Seoul (KR); KIA CORPORATION, Seoul (KR)

(72) Inventors: Kyung Gook Bae, Seoul (KR); Jae Eun Kim, Seoul (KR); Si Myung Jang, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 274 days.

(21) Appl. No.: 18/242,262

(22) Filed: Sep. 5, 2023

(65) Prior Publication Data

US 2024/0339881 A1     Oct. 10, 2024

(30) Foreign Application Priority Data

Apr. 5, 2023     (KR) ........................ 10-2023-0044512

(51) Int. Cl.
H02K 3/28          (2006.01)
H02K 15/35         (2025.01)

(52) U.S. Cl.
CPC .............. H02K 3/28 (2013.01); H02K 15/35 (2025.01)

(58) Field of Classification Search
CPC .. H02K 3/12–14; H02K 3/28; H02K 15/0421; H02K 15/33
USPC .................................................... 310/203–207
See application file for complete search history.

(56) References Cited

U.S. PATENT DOCUMENTS

| | | | | |
|---|---|---|---|---|
| 2016/0285334 A1* | 9/2016 | Turnbull | .................. | H02K 3/50 |
| 2022/0140683 A1* | 5/2022 | Zhu | .......................... | H02K 3/12 |
| | | | | 310/71 |

* cited by examiner

*Primary Examiner* — Oluseye Iwarere
*Assistant Examiner* — Minki Chang
(74) *Attorney, Agent, or Firm* — Lempia Summerfield Katz LLC

(57)          ABSTRACT

In a stator assembly configured to respond to a voltage difference between coils in the same slot in a coil winding part, the coil for each phase includes a first half-coil winding and a second half-coil winding formed by connecting hairpins in series between an outermost layer and an innermost layer in the radial direction of a stator core. A coil end portion disposed in the outermost layer in the radial direction of the stator core in one of the first half-coil winding and the second half-coil winding and a coil end portion disposed in the innermost layer in the radial direction of the stator core in the other one of the first half-coil winding and the second half-coil winding are connected in series by a conductive member.

17 Claims, 12 Drawing Sheets

FIG. 1A "PRIOR ART"
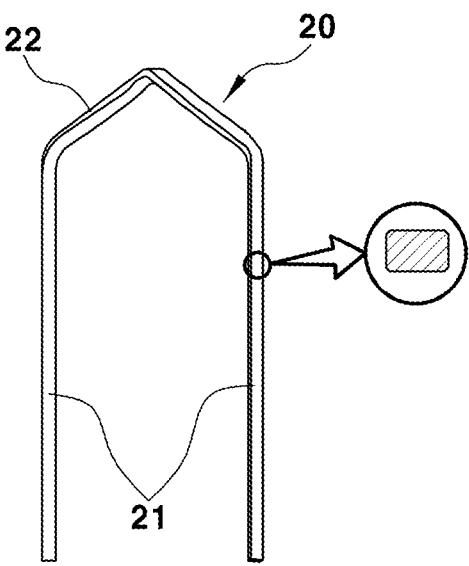

FIG. 1B "PRIOR ART"
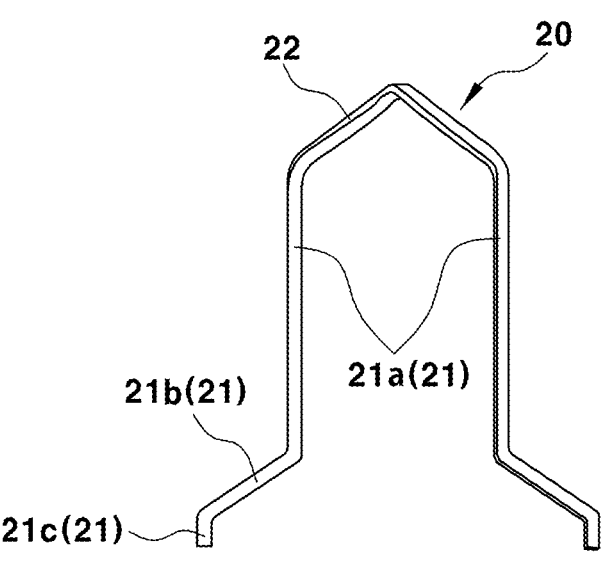

FIG. 2 "PRIOR ART"
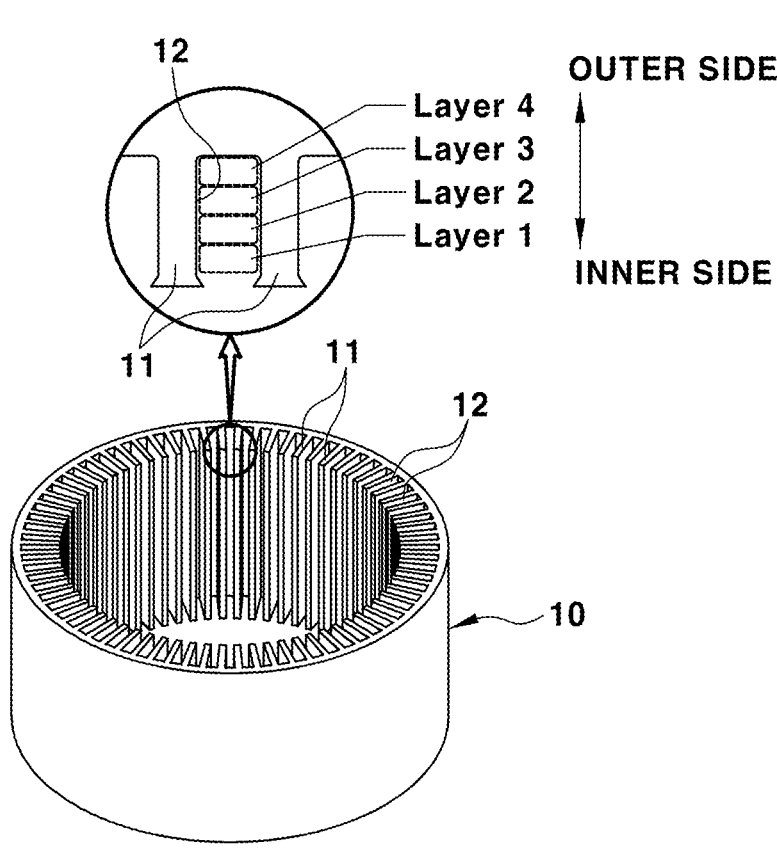

FIG. 3 "PRIOR ART"
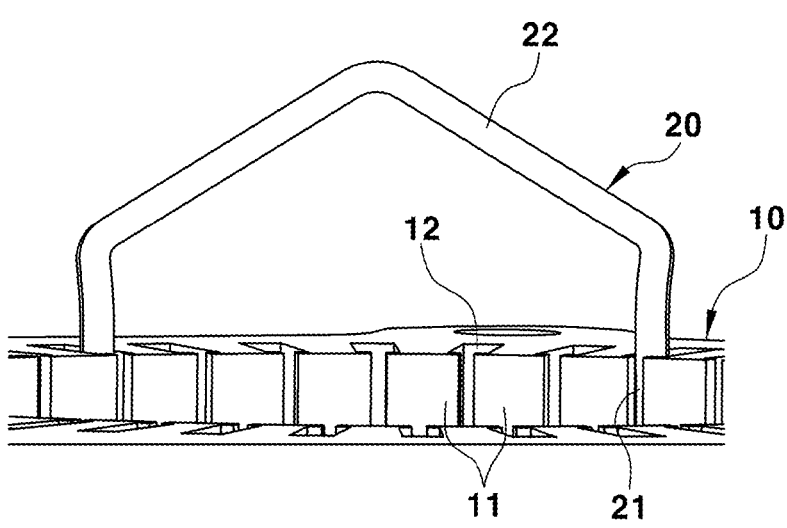

FIG. 4 "PRIOR ART"
CIRCUIT DIAGRAM OF INVERTER       PHASE CONNECTION CIRCUIT
-MOTOR SYSTEM (OEW)         FOR EACH STEP (POTENTIAL DISPLAY)
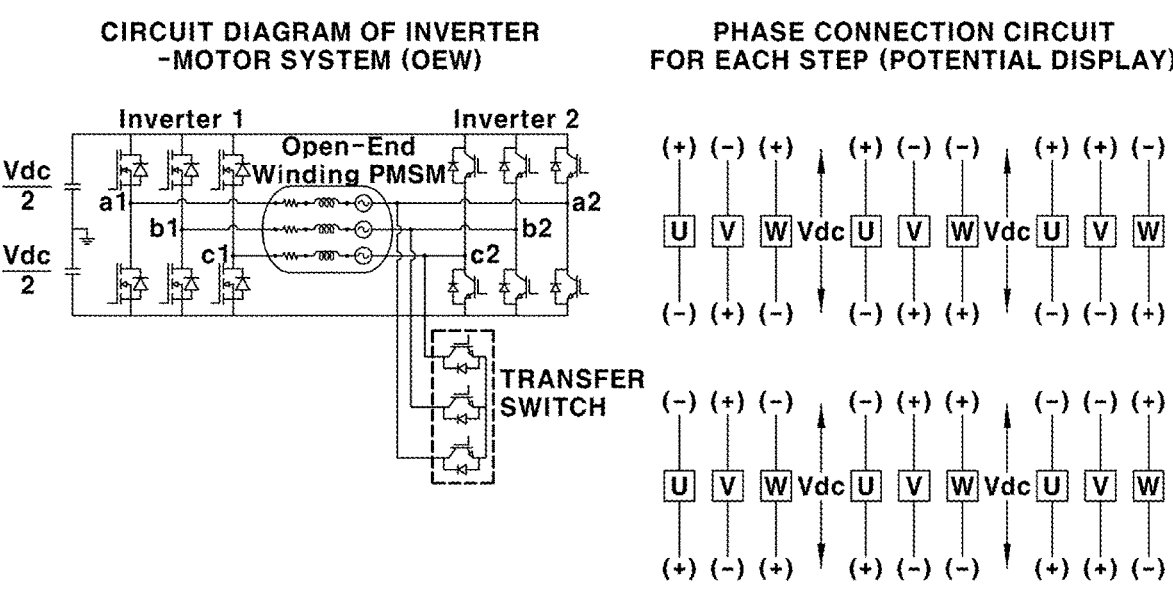

Vdc

FIG. 5B "PRIOR ART"
(CORE OUTER SIDE)
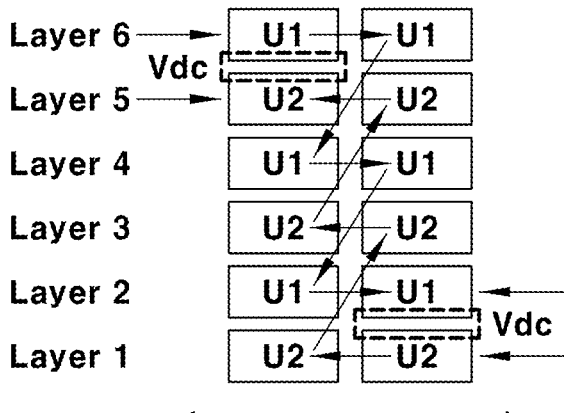
(CORE INNER SIDE)

OUTER SIDE

| | |
|---|---|
| U1 | Layer 10 |
| U2 | Layer 9 |
| U1 | Layer 8 |
| U2 | Layer 7 |
| U1 | Layer 6 |
| U2 | Layer 5 |
| U1 | Layer 4 |
| U2 | Layer 3 |
| U1 | Layer 2 |
| U2 | Layer 1 |

INNER SIDE

FIG. 9　"PRIOR ART"

STATOR ASSEMBLY, A HAIRPIN WINDING MOTOR INCLUDING THE SAME, AND A METHOD OF WINDING STATOR COIL OF A HAIRPIN WINDING MOTOR

CROSS-REFERENCE TO RELATED APPLICATION

This application claims the benefit of and priority to Korean Patent Application No. 10-2023-0044512, filed on Apr. 5, 2023, the entire contents of which are incorporated herein by reference.

TECHNICAL FIELD

The present disclosure relates to a stator assembly including a coil winding part using a hairpin, a hairpin winding motor including the same, and a method of winding a stator coil using a hairpin.

BACKGROUND

As is known, a battery electric vehicle (BEV), a hybrid electric vehicle (HEV), and a fuel cell electric vehicle (FCEV), which are environmentally friendly vehicles, are motor-driven electric vehicles (EVs) in a broad sense. The environmentally friendly vehicle includes a motor, which is a driving source, configured to drive a vehicle, and an inverter configured to drive and control the motor by converting direct current (DC) from a high-voltage power source into alternating current (AC) and applying the AC current to the motor.

As described above, in an environmentally friendly vehicle, a motor is used to generate driving force for driving of a vehicle. For a motor provided to drive the environmentally friendly vehicle (i.e., a driving motor), high efficiency and power density are desired.

In general, the output of a motor is proportional to the number of turns of a coil wound around a stator core. Accordingly, in order to improve the efficiency and output of the motor without increasing the size of the motor, a method of increasing the space factor of the coil wound around the stator core may be considered.

Recently, in order to reduce joule loss of the winding and increase the space factor of the coil, research has been actively conducted on a coil winding method using a flat coil having a substantially rectangular cross-sectional shape instead of using an annular coil having a circular cross-sectional shape.

However, a flat coil is more difficult to wind than an annular coil. Therefore, as a way of facilitating winding of a flat coil, a stator coil winding-type motor using a hairpin-shaped conductor (referred to hereinafter as a "hairpin winding motor") has been proposed. In the following description, a hairpin-shaped conductor used in the motor is referred to as simply a "hairpin".

In a hairpin winding motor, a coil winding part in a stator core may be formed by inserting each of a plurality of hairpins formed in an approximately U-shape into a corresponding one of slots of a stator core, welding the hairpins respectively disposed in layers of the slots, and electrically connecting the same.

When such a hairpin winding method is used, it is possible not only to overcome device limitations due to a winding machine, but also to easily wind the coil even in the case of a flat coil. Particularly, when the hairpin winding method is used, full automation of coil winding work is achieved, thereby making it possible to obtain several advantages such as productivity improvement, cost reduction, stable process, and quality improvement.

In addition, when the hairpin winding method is used, it is possible not only to reduce joule loss of the winding and increase the space factor of the coil in the motor, but also to increase thermal conductivity of the coil in the slot, thereby improving a cooling function as well as efficiency and output of the motor.

The hairpin used to form the coil winding part of the stator in a typical hairpin winding motor has a configuration in which an insulating film having a predetermined thickness is coated on the surface of a U-shaped coil conductor.

A process of manufacturing the hairpin and a process of manufacturing the stator by inserting the hairpin into the slot of the stator core may be performed through an automated device or an automated process.

For example, in a normal hairpin manufacturing process, a continuous flat coil having a configuration in which an insulating film is coated on the surface of a coil conductor is cut to the required length, and then the cut coil is bent, or bent and twisted to form a U shape, thereby manufacturing a hairpin having a desired shape.

Hereinafter, the stator of a typical hairpin winding motor is described in more detail below with reference to FIGS. 1A 5B.

FIGS. 1A-1B are diagrams showing a known hairpin. FIG. 2 is a diagram showing an example in which a plurality of layers is set in each slot of a stator core.

As shown in FIGS. 1A-1B, a hairpin 20 includes two leg parts 21 respectively disposed on opposite sides thereof and a head part 22 connecting the two leg parts 21 to each other. The leg part 21 of the hairpin 20 may have a rectangular cross-sectional shape, and the hairpin 20 may have a U-shape overall.

A pair of leg parts 21 in each hairpin 20 may be formed to extend in the parallel direction. One end portions of the two leg parts 21 are connected to each other through the head part 22. In the example shown in FIGS. 1A-B, the head part 22 forms a V-shape, and the overall shape of the hairpin 20 including the leg part 21 and the head part 22 forms a U-shape.

The head part 22 may be formed in a shape twisted by a predetermined degree so that the two leg parts 21 in one hairpin 20 are respectively inserted into and fastened to different layers in a predetermined slot. In order to mold and manufacture the hairpin 20, the head part 22 may be bent to have a V shape and twisted to have a twisted shape.

Although not shown in detail in the drawings, an insulating film is removed from the opposite end portions of each hairpin 20. More specifically, the insulating film is removed from each end portion of the two leg parts 21 respectively disposed on the opposite sides of each hairpin, thereby allowing a conductor part of the coil (hairpin) to be exposed outside.

Further, as shown in FIG. 2, a stator core 10 is provided with a plurality of teeth 11 and slots 12 arranged in a circumferential direction of the stator core 10 and formed on the inner circumferential portion of the stator core 10. In the stator core 10, each tooth 11 is formed to extend radially toward the inner circumferential portion of the stator core. In this case, in each slot 12, that forms a space between the two adjacent teeth 11, the end portion oriented toward the inner circumferential portion of the stator core may have an open structure.

In addition, as shown in FIG. 2, each slot 12 may have a multilayer structure having a plurality of layers (layers 1 to 4). Each slot 12 may be provided with a plurality of layers (layers 1 to 4) disposed in the radial direction of the stator core.

To this end, in the stator core 10 of the hairpin winding motor, the space between the two slots 12 is divided so that the plurality of layers (layers 1 to 4) are disposed in the radial direction of the stator core. FIG. 2 shows a case in which four layers (layers 1 to 4) are spatially partitioned from each other in one slot 12.

The number of layers formed in each slot may be changed depending on an output of a motor, a winding design method, and the like. For example, two, eight, or ten layers may be formed in each slot as desired.

In addition, the two leg parts 21 of each hairpin 20 are inserted into two slots 12 disposed at regular intervals in the stator core 10. An interval between the slots into which two leg parts of each hairpin are inserted in the stator core may be defined as a pitch of a hairpin winding.

In a case where a neighboring slot directly adjacent to the slot 12 into which one leg part of the two leg parts 21 of the hairpin 20 is inserted is referred to as a first slot. When the other leg part of the hairpin 20 is inserted into a p-th slot ("p" being a natural number), a pitch (a pitch of a hairpin winding), which is an interval between two slots into which two leg parts of a hairpin are respectively inserted, becomes p.

In addition, when two leg parts 21 of each hairpin 20 are respectively inserted into the predetermined slots 12 of the stator core 10, i.e., the two leg parts of each hairpin are respectively inserted into two slots spaced apart from each other by a p-pitch interval, the two leg parts 21 of each hairpin 20 may be inserted into different layers (layers 1 to 4).

For example, when one of the two leg parts 21 of one hairpin 20 is inserted into the layer 1 in the predetermined slot 12 of the stator core 10, the other leg part may be inserted into the layer 2 in the other slot spaced apart from the predetermined slot 12 by a predetermined pitch interval.

In this case, a part of each leg part 21 is accommodated in the slot 12, and the end portion of each leg part is exposed outside the slot. In addition, a portion of each leg part exposed outside the slot is electrically connected to a leg part of the other hairpin by welding after being processed by bending or twisting.

In addition, the hairpins 20 may be respectively inserted into the slots 12 of the stator core 10 at the same pitch, and the hairpins 20 inserted into the slots 12 at the same pitch in this way may form a coil winding part of a stator.

Referring to FIG. 1B, a straight portion 21a of each leg part 21 adjacent to the head part 22 is accommodated in the slot 12, and a remaining portion 21b exposed outside the slot is processed to be bent. Additionally, a bent end portion 21c of each leg part 21 is electrically connected to another hairpin through welding in a state in which an insulating film thereof is removed.

Hereinafter, for convenience of description, the portion 21a of each leg part 21 inserted into and accommodated in the slot 12 of the stator core 10 is referred to as an "inserted portion", the portion 21b of each leg part 21 exposed outside the slot of the stator core is referred to as an "exposed portion", and the portion 21c of each leg part 21 connected to the leg part of another hairpin is referred to as a "connected end portion".

In order to form a coil winding part of a stator using the hairpin 20 manufactured as described above, after inserting insulating paper (not shown) into each slot 12 of the stator core 10, the leg parts 21 of each hairpin 20 are respectively inserted into the slots 12 in the stator core 10 into which the insulating paper is inserted, c1Z the leg parts of two adjacent hairpins respectively inserted into the slots are electrically connected to each other by welding or the like.

FIG. 3 is a diagram showing a state in which the hairpin 20 is inserted into the slot 12 of the stator core 10. When a leg part 21 is inserted into a slot 12 of the stator core 10, the inserted portion 21a (FIG. 1B) of each leg part 21 is inserted into the corresponding slot 12 so as to be accommodated in a predetermined layer.

In this case, although not shown in FIG. 3, on the opposite side of the stator core 10 (not shown), the exposed portion 21b (FIG. 1B) of the leg part 21 of each hairpin 20 is exposed outside the slot 12.

In each of the hairpins 20, the two leg parts 21, disposed on the opposite sides of the hairpin 20 and configured to each include the connected end portion 21c (FIG. 1B) from which the insulating film is removed, are inserted into the two slots 12 spaced apart from each other by a predetermined pitch interval in the stator core 10. The two leg parts on the opposite sides of the hairpin are inserted into different layers in two slots of the stator core.

Further, among the leg parts 21 of the two hairpins 20 inserted into the slots 12, the connected end portions 21c, which are adjacent conductor parts from which each of the insulating films is removed, are welded in a bent (or twisted) state so as to be electrically connected to each other.

In addition, when the coil winding part of the stator is formed using the hairpins as described above, a terminal assembly is connected to a terminal part of the coil winding part. The terminal assembly is a wire-connection structure configured to draw out three phase coils of a coil winding part, to connect neutral points of the three phase coils, and to form a parallel circuit configuration thereof.

When the coil winding part is formed by connecting the hairpins only through welding as in the case of a conventional hairpin winding motor, there is a problem in that it is impossible to optimize winding insulation to respond to a voltage difference between coils having the same phase.

Additionally, in the stator coil winding part of an inverter-motor system to which an open-end winding (OEW) type is applied, a voltage difference between coils having the same phase (the maximum voltage difference "Vdc" occurs between a first turn and a last turn of one phase) increases. Accordingly, it is necessary to apply a new winding structure optimized for insulation.

FIG. 4 is a diagram showing a circuit diagram of an inverter-motor system to which an OEW type is applied. In particular, FIG. 4 shows a connection state between an inverter and a stator coil winding part. FIGS. 5A-B are diagrams showing a voltage difference between the same phases in a conventional hairpin winding motor. In particular, FIGS. 5A-B show an example in which one phase has 24 turns.

In FIG. 5A, when the coil winding of a U-phase has 24 turns and a two-parallel (U1, U2) configuration, in the case of OEW type, the maximum voltage difference "Vdc" occurs between the first turn and the last turn of the same phase.

Further, according to the example of FIG. 5B, in a coil winding part of a stator including hairpins, a coil portion at which the maximum voltage difference between coils having the same phase occurs is a portion at which a coil of the first turn and a coil of the last turn are adjacent to each other. In this case, two coils have the same phase. Here, as shown in FIG. 5B, the maximum voltage difference may occur at a portion between coils of the innermost two layers (layers 1 and 2) in the same slot and a portion between coils of the outermost two layers (layers 5 and 6) in the same slot.

Referring to FIG. 5B, it may be seen that the maximum voltage difference "Vdc" occurs between the layer 5 (U1) and the layer 6 (U2) in the same slot, which is a combination of the first turn and the last turn, and the maximum voltage difference "Vdc" occurs between the layer 1 (U2) and the layer 2 (U1) in the same slot, which is another combination of the first turn and the last turn.

As described above, in the case of the OEW type, the maximum voltage difference "Vdc" occurs, and during inverter PWM switching, a voltage higher than a steady-state voltage may be momentarily generated. As a result, cross-insertion of insulating paper is desired for each slot, and an insulating material such as more optimized insulating film or insulating paper is desired.

When winding optimization is performed in consideration of the maximum voltage difference between coils having the same phase only using a hairpin in the conventional winding structure described above, the height of an end coil (a portion of the hairpin exposed outside the slot) may increase, or mass productivity may deteriorate, due to structural disadvantages.

In addition, it is desired to strengthen insulation design specifications in response to an increase in voltage difference between coils having the same phase (insulation reinforcement design is required). When the thickness of an insulating material such as insulating film or insulating paper is increased or an insulating material is added, excessive insulation may cause problems such as a decrease in the space factor of a coil, a decrease in mass productivity, and an increase in price.

The above information disclosed in this Background section is only for enhancement of understanding of the background of the disclosure. Therefore it may contain information that does not form the prior art that is already known to a person having ordinary skill in the art.

SUMMARY

The present disclosure has been made in an effort to solve the above-described problems associated with the prior art. An object of the present disclosure is to provide a stator assembly capable of achieving optimization of winding insulation to respond to a voltage difference between coils having the same slot in a coil winding part, a hairpin winding motor including the same, and a method of winding a stator coil of the hairpin winding motor.

Another object of the present disclosure is to provide a stator assembly and a method of winding a stator coil capable of reliably solving problems related to a conventional winding method optimized to reduce a voltage difference between coils having the same phase in the same slot in a stator coil winding part of an inverter-motor system to which an open-end winding (OEW) type is applied, such as problems related to insulation reinforcement design, excessive insulation, deterioration in the space factor of a coil, deterioration in mass productivity, an increase in price, and the like.

The objects of the present disclosure are not limited to the above-mentioned objects, and other technical objects not mentioned herein should be clearly understood by those having ordinary skill in the art to which the present disclosure pertains from the detailed description of the embodiments.

In an embodiment, a stator assembly is provided. The stator assembly includes a stator core having a plurality of slots formed in a circumferential direction thereof. The plurality of slots are disposed on an inner circumferential portion of the stator core. The stator assembly also includes a coil winding part having hairpins respectively inserted into the slots of the stator core. The hairpins are connected in series to form a coil for each of a U-phase, a V-phase, and a W-phase. Each of the slots has a space partitioned into a plurality of layers arranged in a radial direction of the stator core The coil for each phase includes a first half-coil winding and a second half-coil winding formed by connecting the respective hairpins in series between an outermost layer and an innermost layer in the radial direction of the stator core. In the first half-coil winding and the second half-coil winding, a coil end portion disposed in the outermost layer in the radial direction of the stator core in one of the first half-coil winding and the second half-coil winding and a coil end portion disposed in the innermost layer in the radial direction of the stator core in the other one of the first half-coil winding and the second half-coil winding are connected in series by a conductive member.

In an aspect, two layers adjacent to each other inwards and outwards in the radial direction of the stator core in each slot may be defined as a set, and two leg parts of each hairpin forming the coil for each phase may be respectively inserted into the different layers in the same set of the two slots spaced apart from each other by a predetermined pitch (p) interval in the circumferential direction of the stator core.

In an aspect, the first half-coil winding and the second half-coil winding of the coil of each phase may include coil windings for the respective sets formed by connecting, in series, the hairpins respectively inserted into the layers in the same set in the plurality of slots. The coil windings for the respective sets may be connected in series with a coil winding of another neighboring set by a jumper to form the first half-coil winding and the second half-coil winding.

In an aspect, the jumper may include a jumper having a y-pitch interval, wherein the jumper connects the coil windings of different sets wound in the two slots spaced apart from each other by the y-pitch interval in the circumferential direction of the stator core. The jumper may also include a jumper having a (y−1)-pitch interval, wherein the jumper connects the coil windings of different sets wound in the two slots spaced apart from each other by the (y−1)-pitch interval in the circumferential direction of the stator core. The jumper may further include a jumper having a (y+1)-pitch interval, wherein the jumper connects the coil windings of different sets wound in the two slots spaced apart from each other by the (y+1)-pitch interval in the circumferential direction of the stator core.

In an aspect, the y-pitch interval may be set equal to the pitch (p) interval between the slots having the two leg parts of each hairpin forming the coil for each phase inserted thereinto.

In an aspect, the conductive member may connect the coil end portion of the first half-coil winding to the coil end portion of the second half-coil winding, wherein the coil end portions are respectively inserted into the two slots spaced apart from each other by the y-pitch interval.

In an aspect, the stator core may have a total of 48 slots arranged in the circumferential direction thereof and formed on the inner circumferential portion thereof. The two leg parts of each hairpin forming the coil for each phase may be respectively inserted into the slots spaced apart from each other by six-pitch (p) interval. The jumper may include a jumper having a five-pitch interval, a jumper having a six-pitch interval, and a jumper having a seven-pitch interval.

In an aspect, the coil for each phase may have a two-parallel wire-connection structure formed by connecting two coil windings in parallel using a terminal assembly, and the two coil windings may be formed by connecting the first half-coil winding to the second half-coil winding in series using the conductive member.

In another embodiment, a hairpin winding motor including a stator assembly is provided. The stator assembly includes a stator core having a plurality of slots formed in a circumferential direction thereof. The plurality of slots are disposed on an inner circumferential portion of the stator core. The stator assembly also includes a coil winding part having hairpins respectively inserted into the slots of the stator core. The hairpins are connected in series to form a coil for each of a U-phase, a V-phase, and a W-phase. Each of the slots has a space partitioned into a plurality of layers arranged in a radial direction of the stator core. The coil for each phase includes a first half-coil winding and a second half-coil winding formed by connecting the respective hairpins in series between an outermost layer and an innermost layer in the radial direction of the stator core. In the first half-coil winding and the second half-coil winding, a coil end portion disposed in the outermost layer in the radial direction of the stator core in one of the first half-coil winding and the second half-coil winding and a coil end portion disposed in the innermost layer in the radial direction of the stator core in the other one of the first half-coil winding and the second half-coil winding are connected in series by a conductive member.

In an aspect, two layers adjacent to each other inwards and outwards in the radial direction of the stator core in each slot may be defined as a set. Two leg parts of each hairpin forming the coil for each phase may be respectively inserted into the different layers in the same set of the two slots spaced apart from each other by a predetermined pitch (p) interval in the circumferential direction of the stator core.

In an aspect, the first half-coil winding and the second half-coil winding of the coil of each phase may include coil windings for the respective sets formed by connecting, in series, the hairpins respectively inserted into the layers in the same set in the plurality of slots. The coil windings for the respective sets may be connected in series with a coil winding of another neighboring set by a jumper to form the first half-coil winding and the second half-coil winding.

In an aspect, the jumper may include a jumper having a y-pitch interval, wherein the jumper connects the coil windings of different sets wound in the two slots spaced apart from each other by the y-pitch interval in the circumferential direction of the stator core. The jumper may also include a jumper having a (y−1)-pitch interval, wherein the jumper connects the coil windings of different sets wound in the two slots spaced apart from each other by the (y−1)-pitch interval in the circumferential direction of the stator core. The jumper may further include a jumper having a (y+1)-pitch interval, wherein the jumper connects the coil windings of different sets wound in the two slots spaced apart from each other by the (y+1)-pitch interval in the circumferential direction of the stator core.

In an aspect, the y-pitch interval may be set equal to the pitch (p) interval between the slots having the two leg parts of each hairpin forming the coil for each phase inserted thereinto.

In still yet another preferred embodiment, the coil for each phase may have a two-parallel wire-connection structure formed by connecting two coil windings in parallel using a terminal assembly, wherein the two coil windings are formed by connecting the first half-coil winding to the second half-coil winding in series by the conductive member.

In still another embodiment, a method of winding a stator coil of a hairpin winding motor is provided. The method includes providing a stator core having a plurality of slots formed in a circumferential direction thereof, wherein the plurality of slots are disposed on an inner circumferential portion of the stator core. The method also includes partitioning a space in each slot of the stator core into a plurality of layers arranged in a radial direction of the stator core, and respectively inserting hairpins into the slots of the stator core. The method additionally includes performing stator coil winding to connect the hairpins inserted thereinto in series to form a coil for each of a U-phase, a V-phase, and a W-phase. The coil for each phase includes a first half-coil winding and a second half-coil winding formed by connecting the respective hairpins in series between an outermost layer and an innermost layer in the radial direction of the stator core. In the first half-coil winding and the second half-coil winding, a coil end portion disposed in the outermost layer in the radial direction of the stator core in one of the first half-coil winding and the second half-coil winding and a coil end portion disposed in the innermost layer in the radial direction of the stator core in the other one of the first half-coil winding and the second half-coil winding are connected in series by a conductive member.

In an aspect, two layers adjacent to each other inwards and outwards in the radial direction of the stator core in each slot may be defined as a set. Two leg parts of each hairpin forming the coil for each phase may be respectively inserted into the different layers in the same set of the two slots spaced apart from each other by a predetermined pitch (p) interval in the circumferential direction of the stator core.

In an aspect, the first half-coil winding and the second half-coil winding of the coil of each phase may include coil windings for the respective sets formed by connecting, in series, the hairpins respectively inserted into the layers in the same set in the plurality of slots. The coil windings for the respective sets may be connected in series with a coil winding of another neighboring set by a jumper to form the first half-coil winding and the second half-coil winding.

In an aspect, the jumper may include a jumper having a y-pitch interval, wherein the jumper connects the coil windings of different sets wound in the two slots spaced apart from each other by the y-pitch interval in the circumferential direction of the stator core. The jumper may also include a jumper having a (y−1)-pitch interval, wherein the jumper connects the coil windings of different sets wound in the two slots spaced apart from each other by the (y−1)-pitch interval in the circumferential direction of the stator core. The jumper may further include a jumper having a (y+1)-pitch interval, wherein the jumper connects the coil windings of different sets wound in the two slots spaced apart from each other by the (y+1)-pitch interval in the circumferential direction of the stator core.

In an aspect, the y-pitch interval may be set equal to the pitch (p) interval between the slots having the two leg parts of each hairpin forming the coil for each phase inserted thereinto.

In an aspect, the coil for each phase may form a two-parallel wire-connection structure by connecting two coil windings in parallel using a terminal assembly, wherein the two coil windings are formed by connecting the first half-coil winding to the second half-coil winding in series using the conductive member.

These and other aspects and embodiments of the present disclosure are described in more detail below.

It should be understood that the terms "vehicle", "vehicular", and other similar terms as used herein are inclusive of motor vehicles in general, such as passenger automobiles including sport utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g. fuels derived from resources other than petroleum). As referred to herein, a hybrid vehicle is a vehicle that has two or more sources of power, for example, vehicles powered by both gasoline and electricity.

The above and other features of the present disclosure are described in more detail below.

BRIEF DESCRIPTION OF THE DRAWINGS

The above and other features of the present disclosure are described in detail with reference to certain embodiments illustrated in the accompanying drawings which are provided for illustration only, and thus are not limitative of the present disclosure, and wherein:

FIGS. 1A-B are diagrams showing a known hairpin;

FIG. 2 is a diagram showing an example in which a plurality of layers is set in each slot of a stator core;

FIG. 3 is a diagram showing a state in which a hairpin is inserted into the slot of the stator core;

FIG. 4 is a diagram showing a circuit diagram of an inverter-motor system to which an OEW type is applied;

Figure 5A:
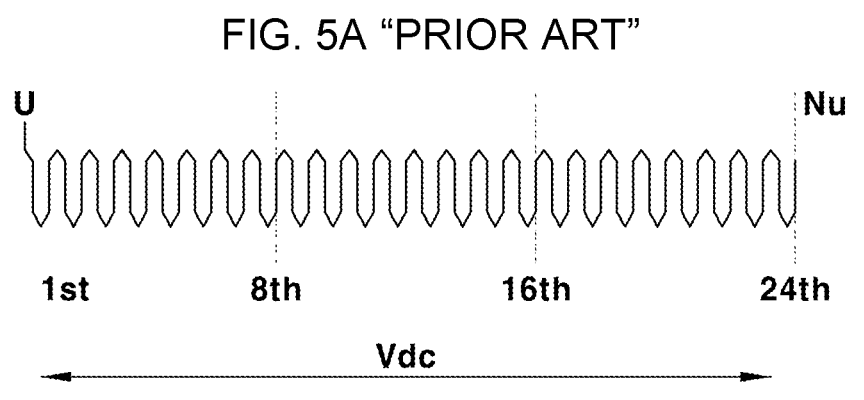

FIGS. 5A-B are diagrams showing a voltage difference between the same phases in a conventional hairpin winding motor;

Figure 6:
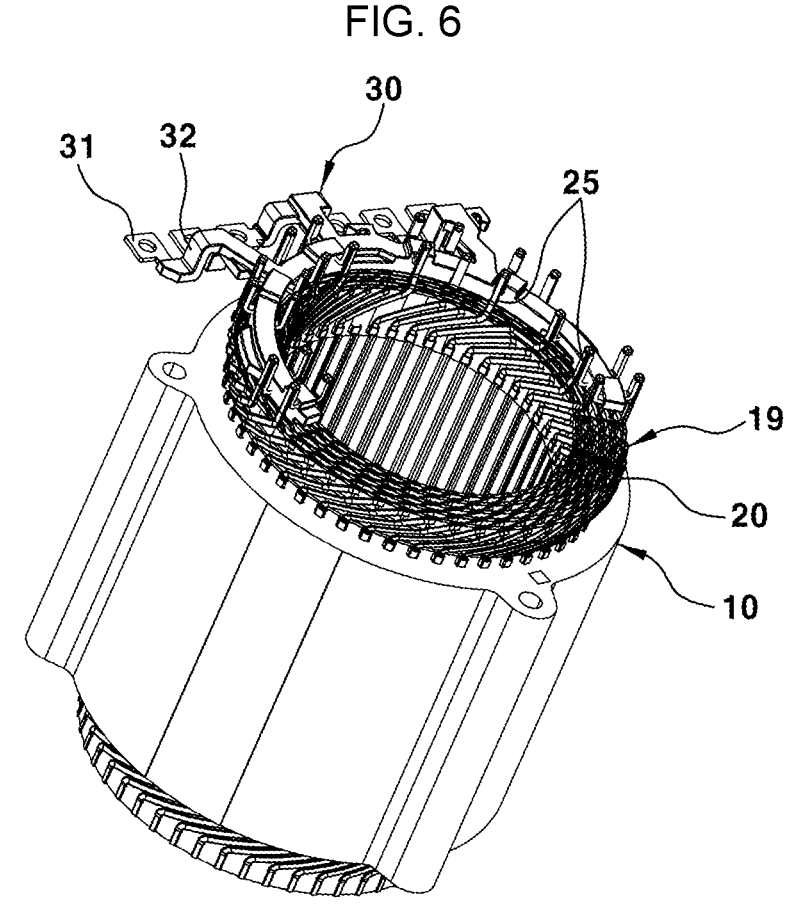
FIG. 6 is a perspective view showing a stator of a hairpin winding motor, according to an embodiment of the present disclosure.

It should be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes, should be determined in part by the particular intended application and use environment.

In the figures, reference numbers refer to the same or equivalent parts of the present disclosure throughout the several figures of the drawing.

DETAILED DESCRIPTION

Hereinafter, embodiments of the present disclosure are described in detail with reference to the accompanying drawings. Specific structural or functional descriptions made in connection with the embodiments of the present disclosure are merely illustrative for the purpose of describing embodiments according to concepts of the present disclosure, and the embodiments according to the concepts of the present disclosure may be implemented in various forms. Further, it should be understood that the present description is not intended to limit the present disclosure to the described embodiments. On the contrary, the present disclosure is intended to cover not only the described embodiments, but also various alternatives, modifications, equivalents, and other embodiments, which may be included within the spirit and scope of the present disclosure as defined by the appended claims.

In the following description, terms such as "first" and/or "second" may be used to describe various components, but the components are not limited by the terms. The terms are used only for the purpose of distinguishing one component from other components. For example, a first component may be referred to as a second component, and similarly, a second component may also be referred to as a first component without departing from the scope of rights according to the concepts of the present disclosure.

When one component is referred to as being "connected" or "joined" to another component, the one component may be directly connected or joined to the other component, but it should be understood that other components may be present therebetween. On the other hand, when the one component is referred to as being "directly connected to" or "directly in contact with" the other component, it should be understood that other components are not present therebetween. Other expressions for the description of relationships between components, that is, "between" and "directly between" or "adjacent to" and "directly adjacent to", should be interpreted in the same manner.

The same reference numerals represent the same components throughout the specification. Additionally, the terms in the specification are used merely to describe embodiments, and are not intended to limit the present disclosure. In this specification, an expression in a singular form also includes a plural form, unless otherwise clearly specified in context. As used herein, expressions such as "comprise" and/or "comprising" do not exclude the presence or addition of one or more components, steps, operations, and/or elements other than those described.

When a component, device, element, or the like of the present disclosure is described as having a purpose or performing an operation, function, or the like, the component, device, or element should be considered herein as being "configured to" meet that purpose or perform that operation or function.

FIG. 6 is a perspective view showing a stator assembly of a motor, according to an embodiment of the present disclosure.

The present disclosure relates to a stator assembly and a motor including the stator assembly. The motor according to embodiments of the present disclosure is a stator coil winding type motor to which a hairpin-shaped conductor is applied.

In the following description, the hairpin-shaped conductor is sometimes referred to as a "hairpin", and the stator coil winding type motor to which the hairpin is applied is sometimes referred to as a "hairpin winding motor".

In addition, in the present disclosure, a "stator coil winding" is defined as winding a stator coil around a stator core using a hairpin and/or as forming a coil winding part of a stator assembly using the hairpin.

The stator assembly according to embodiments of the present disclosure includes a stator core 10, a coil winding part 19 formed by winding the stator coil around the stator core 10, and a terminal assembly 30 connected to the coil winding part 19.

In an embodiment, the coil winding part 19 of the stator assembly is formed of a hairpin 20. For example, the coil winding part 19 may be formed by performing the stator coil winding on the stator core 10 using the hairpin 20.

In an embodiment, a method of performing stator coil winding using the hairpin 20 to form the coil winding part 19 in the stator assembly of the hairpin winding motor includes a connection and a wire-connection method between hairpins capable of reducing a voltage difference between coils (between the same phases) in the same slot.

According to an embodiment of the present disclosure, stator coils having the same phase are wound by the hairpin 20 in the same slot (e.g., slot 12 in FIG. 2) of the stator core 10. Accordingly, all coils in the same slot become coils having the same phase (U-phase, V-phase, or W-phase).

A motor according to an embodiment of the present disclosure includes a stator (stator assembly) around which a coil is wound and a rotor having a permanent magnet installed therein, which is not different from a known motor. As used herein, the stator refers to a stator assembly having a configuration in which a stator core, a coil winding part, and a terminal assembly are combined.

In an embodiment, in the stator assembly of the motor, the coil winding part 19 formed by winding a coil around the stator core 10 is electrically connected to the plurality of hairpins 20 inserted into the slot of the stator core 10 (e.g., the slots 12 in FIG. 2).

In embodiments, features of the hairpin, such as the shape of the hairpin, may correspond to features (e.g., the shape) of the hairpin 20 of FIGS. 1A-B. Further, in embodiments, a plurality of (m) layers may be set in each slot 12 of the stator core 10 as illustrated in FIG. 2. Furthermore, in embodiments, the hairpin may be inserted into the slot 12 of the stator core 10 as illustrated in FIG. 3.

It is noted that, although FIG. 2 shows an example in which four layers (layers 1 to 4) are set in each slot 12, the present disclosure is not limited to this example. For example, the number of layers set in the slot 12 of the stator core 10 may be variously changed to 8 or 10, in some embodiments.

In an embodiment, the hairpin 20 used to form the coil winding part 19 of the stator assembly generally corresponds to a known hairpin in shape and/or manufacturing method.

For example, as shown in FIGS. 1A and 1B, the hairpin 20 may be manufactured to have an overall U-shape, and may have a configuration in which an insulating film having a predetermined thickness is coated on the surface of a conductor.

In addition, the hairpin 20 may be formed to include two leg parts 21 on the opposite sides thereof and the head part 22 connecting the two leg parts 21 to each other. In each hairpin 20, a pair of leg parts 21 may be formed to extend in the parallel direction, and one end portions of the two leg parts 21 are connected to each other through the head part 22.

The head part 22 may be formed in a shape twisted by a predetermined degree, thereby allowing the two leg parts 21 of one hairpin 20 to be respectively inserted into and fastened to different layers in predetermined slots. For molding of the hairpin 20, the head part 22 may be bent to have a V-shape and may be twisted to have a twisted shape.

An insulating film may be removed from the opposite end portions of each hairpin 20, that is, from each end portion of the two leg parts 21 disposed on the opposite sides of each hairpin 20, and a conductor part of the coil (hairpin) may be exposed to the outside.

Further, as shown in FIG. 2, the stator core 10 may include a plurality of teeth 11 and the slots 12 disposed in the circumferential direction. In the stator core 10, the tooth 11 may be formed to extend radially from the outer circumferential side of the stator core toward the inner circumferential portion thereof. In this case, an end portion toward the inner circumferential portion of the stator core 10 in each slot 12, which is a space between two adjacent teeth 11, may have an open structure.

In an embodiment, each slot 12 may have a multilayer structure having a plurality of (m) layers. For example, each slot 12 may be provided with a plurality of layers disposed in the radial direction of the stator core 10. To this end, in the stator core 10 of the hairpin winding motor, a space in each slot 12 may be divided so that a plurality of layers are disposed in the radial direction of the stator core.

In an embodiment, when two leg parts 21 of each hairpin 20 are inserted into two slots 12 spaced apart from each other by a predetermined interval (pitch) in the stator core 10, the two leg parts 21 of each hairpin 20 may be inserted into different layers.

For example, if one of the two leg parts 21 of the hairpin 20 is inserted into the layer 1 in one slot 12 of the stator core 10, the other leg part thereof may be inserted into the layer 2 in the other slot 12 spaced apart from the one slot 12 by a predetermined pitch (p) interval.

In an embodiment, a part of each leg part 21 is accommodated in the slot 12, and the end portion of each leg part is exposed outside the slot. In addition, a portion of each leg part 21, the portion being exposed outside the slot, may be electrically connected to a portion of each leg part of the other hairpin by welding after being processed by bending or twisting.

In order to form the coil winding part 19 of the stator assembly using the hairpin 20 manufactured as described above, each leg part 21 of the hairpin 20 may be inserted into the predetermined slot 12 of the stator core 10, and the leg parts of two adjacent hairpins respectively inserted into the slots may be electrically connected to each other by welding or the like.

In this case, an inserted portion (e.g., the portion 21*a* in FIG. 1B) of each leg part 21 is inserted into the corresponding slot 12 so as to be accommodated in a predetermined layer. Further, although not shown in the FIG. 1B, on the opposite side of the stator core 10, an exposed portion (e.g., the portion 21*b* in FIG. 1B) of the leg part 21 of each hairpin 20 is exposed outside the slot 12.

In each of the hairpins 20, the two leg parts 21 each having a connected end portion (e.g., the portion 21*c* in FIG. 1B) from which an insulating film is removed, may be respectively inserted into the two slots 12 spaced apart from each other by a predetermined pitch (p) interval in the stator core 10. In this case, the two leg parts 21 disposed on the opposite sides of the hairpin 20 are respectively inserted into different two slots 12 of the stator core 10 so as to be located in different layers.

Further, in the leg parts 21 of the two hairpins 20 respectively inserted into the different slots 12, the connected end portions 21*c*, which are adjacent conductor parts from which an insulating film is removed, may be welded in a bent (or twisted) state so as to be electrically connected to each other.

In addition, when the coil winding part 19 of the stator assembly is formed using the hairpins 20 as described above, the terminal assembly 30 or other wire-connection structure, may be connected to a terminal part of the coil winding part 19.

In an embodiment, the terminal assembly 30 includes a busbar 31 serving as a conductive member configured to connect the terminal part of the coil winding part 19 to an external circuit such as an inverter circuit. The terminal assembly 30 may have a configuration in which the busbar 31 and an injection-molded part 32 are combined.

In a typical closed-end winding (CEW) type inverter-motor system, the terminal assembly installed on the stator side of the motor is used only for wire-connection, such as external withdrawal and electrical connection of three phase coils, connection of neutral points of the three phase coils, and a parallel circuit configuration thereof.

However, the motor according to emblements of the present disclosure may be applied to the open-end winding (OEW) type inverter-motor system, and the terminal assembly may be used for jump connection between coils in addition to external withdrawal and electrical connection of the three phase coils.

To this end, in an embodiment, the terminal assembly includes a plurality of busbars 31 serving as a conductive member configured to electrically connect input-and-output terminal parts of the respective phase coils of the coil winding part 19 to an external circuit such as an inverter circuit.

As used herein, coils of the respective phases (U-phase, V-phase, and W-phase) may have the same meaning as hairpins of the respective phases, the hairpins being respectively inserted into slots to form a coil winding part.

In addition, as described below, the terminal assembly 30 may include a separate conductive member, such as a series-connection busbar 33 in FIG. 8, configured to electrically jump and connect a coil of the outermost layer in the radial direction of a specific slot in each coil of each phase to a coil of the innermost layer in the radial direction of the other slot adjacent to the specific slot.

In the case of an example of the OEW type inverter-motor system shown in FIG. 4, each phase circuit of the U-phase, the V-phase, and the W-phase has an input terminal ((+) terminal) and an output terminal ((−) terminal), and the input terminal and the output terminal for each phase circuit are connected to an inverter-side circuit, which is an external circuit, through the terminal assembly 30.

The motor according to embodiments of the present disclosure forms the OEW type inverter-motor system with the inverter, and in the OEW type circuit configuration, the end portion of each phase coil of the coil winding part 19 is provided with an input terminal part configured to receive current and an output terminal part configured to output current.

In an embodiment, in the coil winding part 19 of the stator assembly, the input terminal part and the output terminal part for each phase coil respectively correspond to the input terminal ((+) terminal) and the output terminal ((−) terminal) in FIG. 4. The input terminal part and the output terminal part may be connected to the inverter-side circuit through the busbar 31 of the terminal assembly 30.

Further, in the coil winding part 19, as a coil of the input terminal part and the output terminal part to which the busbar 31 of the terminal assembly 30 is connected, and a coil of a jump connection point between slots for the respective phase coils, a lead pin 25 (FIGS. 6 and 8), which may comprise an I-shaped conductor, may be used instead of a hairpin-shaped (U-shaped) conductor.

The lead pin 25 may be a conductor serving as an input/output terminal and a jump terminal in the coil winding part 19. The lead pin may have a configuration in which the insulating films are respectively removed from the opposite end portions thereof in the same manner as that of the hairpin 20.

When the coil winding part 19 is formed, in a state in which the lead pin 25 is inserted into the slot 12 of the stator core 10, one end portion of the lead pin 25 is exposed to one side of the stator, which is the side on which the head part (e.g., the head part 22 in FIG. 3) of the hairpin 20 is located, and the other end portion of the lead pin 25 is exposed to the other side of the stator, which is the side on which the exposed portion (e.g., the portion 21*b* in FIG. 1B) and the connected end portion (e.g., the portion 21*c* in FIG. 1B) in the leg part (e.g., the leg part 21 in FIGS. 1A-B) of the hairpin 20 are located.

Figure 8:
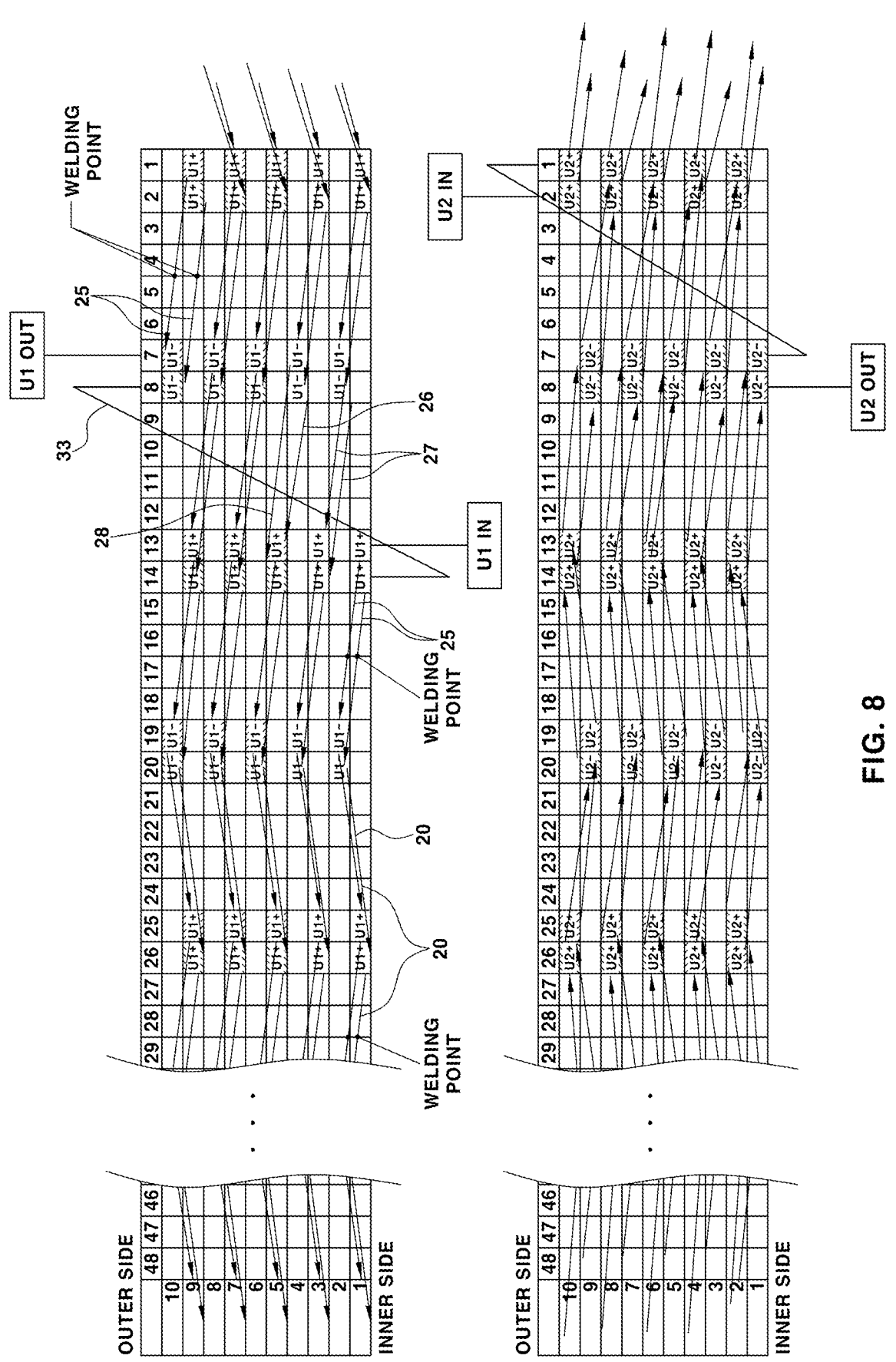
FIG. 8 is a developed view of a winding connection showing a method of winding a stator coil of the hairpin winding motor, according to an embodiment of the present disclosure.

In an embodiment, one end portion of the lead pin 25 exposed in the same direction as the head part 22 of the hairpin 20 in the stator is electrically connected to, e.g., through welding, a conductive member of a terminal assembly for connection with an external circuit (e.g., a busbar of a terminal assembly) or a separate conductive member for jump connection (e.g., jumpers 26, "7, and 28 in FIG. 8), and a busbar (e.g., a series-connection busbar 33 in FIG. 8).

In addition, the other end portion of the lead pin 25 exposed in the same direction as the exposed portion 21*b* and the connected end portion 21*c* of the leg part 21 of the hairpin 20 in the stator may be electrically connected to the connected end portion 21*c* of the hairpin 20, e.g., through welding.

Figure 7:
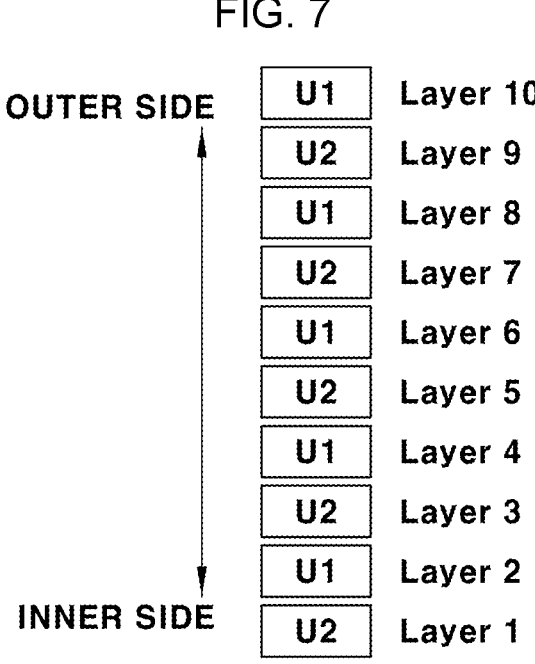
FIG. 7 is a diagram showing arrangement of layers and arrangement of U-phase coils in a slot in a stator core of the hairpin winding motor, according to an embodiment of the present disclosure.

FIG. 7 is a diagram showing an arrangement state of layers and coils each having a U-phase in the slot in the stator core of the hairpin winding motor according to an embodiment of the present disclosure. More specifically, FIG. 7 shows a state in which coils having the same phase (U-phase) in each slot are wound by the hairpin.

Further, FIG. 7 shows an example in which 10 layers (layers 1 to 10) arranged in the radial direction of the stator core are set in one slot. In FIG. 7, "inside" and "outside" represent the inner side and the outer side in the radial direction of the stator core.

Referring to the example of FIG. 7, in one slot, 10 layers (layers 1 to 10) and coils having the same phase (U-phase) are disposed in the radial direction of the stator core. The upper side in the drawing represents the outer side in the radial direction of the stator core, and the lower side in the drawing represents the inner side in the radial direction of the stator core.

In the example of FIG. 7, the uppermost layer (layer 10) is the outermost layer in the radial direction of the stator core, and the lowest layer (layer 1) is the innermost layer in the radial direction of the stator core.

In the case of the U-phase, as shown in FIG. 7, one U-phase coil is wound so as to be disposed in each layer of one slot. In an embodiment, the coil of U1 and the coil of U2 connected in parallel may be alternately disposed along the slot.

In an embodiment of the present disclosure, the coil winding part of the stator assembly is configured to have a wire-connection structure of two parallel windings for each phase (U-phase, V-phase, and W-phase). For example, among the U-phase coil windings, the coil winding of U1 and the coil winding of U2 are individual series-connected windings formed by connecting the respective hairpins in series, and the coil winding of U1 and the coil winding of U2 are connected in parallel to form the U-phase coil winding.

Although only the arrangement of the U-phase coils is shown in FIG. 7, the V-phase coil and the W-phase coil may be wound in the same manner in the adjacent slots, in some embodiments. For example, in the V-phase coil and the W-phase coil as well, the coil of V1 and the coil of V2, and the coil of W1 and the coil of W2 may be alternately disposed in the 10 layers in each slot in the radial direction of the stator core.

The V-phase coil winding also has a wire-connection structure of two parallel windings obtained by connecting the coil winding of V1 to the coil winding of V2, which are individual series-connected windings formed by connecting the hairpins in series, in parallel. Further, he W-phase coil winding also has a wire-connection structure of two parallel windings obtained by connecting the coil winding of W1 to the coil winding of W2, which are individual series-connected windings, in parallel.

In the conventional coil winding part, the maximum voltage difference occurs between coils having the same phase, the coils being adjacent to each other in the same slot of the stator core, particularly between a coil of the first turn (first turn of U1) and a coil of the last turn (first turn of U2) of the same phase, the coils being adjacent to each other.

In an embodiment, referring to FIG. 7, if a coil part of U1 and a coil part of U2 wound around the first layer (layers 1 and 2) on the inner side in the radial direction of the stator core are coil parts of the first turn and the last turn, the maximum voltage difference occurs between the coil part of U1 and the coil part of U2.

Alternatively, if a coil part of U1 and a coil part of U2 wound around the first layer (layers 9 and 10) on the outer side in the radial direction of the stator core in FIG. 7 are coil parts of the first turn and the last turn, the maximum voltage difference occurs between the coil part of U1 and the coil part of U2.

As described above, in the conventional coil winding part, a voltage difference between coils having the same phase (the maximum voltage difference "Vdc" between the first turn and the last turn adjacent to each other in the same phase) increases. Accordingly, it is desired to apply a new winding structure optimized for insulation.

Particularly, in the conventional coil winding part, since only coils (hairpins) are wound, windings in which the first turn and the last turn are adjacent to each other inevitably occur. Therefore, even if a hairpin having an insulating film is used, insulating paper having optimized thickness or shape is required to respond to the maximum voltage difference between the first turn and the last turn of the same phase.

When the thickness of an insulating material such as an insulating film or insulating paper is increased or insulation is added, excessive insulation may cause problems such as a decrease in the space factor of a coil, a decrease in mass productivity, and an increase in price.

According to embodiments of the present disclosure, stator coil winding is performed so that the first turn and the last turn of the same phase are not disposed adjacent to each other, thereby forming a coil winding part. Accordingly, in embodiment of the present disclosure, a voltage difference between the same phases is reduced by jumping and winding a coil in the inner layer and a coil in the outer layer at a middle turn point of a winding.

In an embodiment, an additional conductive member for jump connection is provided in the wire-connection structure. For example, coils in both layers may be jumped to be connected to each other by welding a jumper and a series-connection busbar of a terminal assembly to the coil of the inner layer and the coil of the outer layer.

Hereinafter, a hairpin winding method according to an embodiment of the present disclosure is described in more detail. FIG. 8 is a developed view of a winding connection showing a method of winding the stator coil of the hairpin winding motor, according to an embodiment of the present disclosure.

In an embodiment, in a stator assembly according to an embodiment of the present disclosure, the core winding part 19 includes phase-specific coils such as a U-phase coil, a V-phase coil, and a W-phase coil. The coil for each phase may include a first half-coil winding (for example, first half-U1 and U2 coil windings described below) and a second half-coil winding (for example, second half-U1 and U2 coil windings described below) formed by connecting the hairpins 20 in series between the outermost layer (for example, the layer 10) and the innermost layer (for example, the layer 1) in the radial direction of the stator core 10, respectively.

In an embodiment, in the first half-coil winding and the second half-coil winding, an end portion of a coil winding disposed in the outermost layer in the radial direction of the stator core 10 in one of the first half-coil winding and the second half-coil winding and an end portion of a coil winding disposed in the innermost layer in the radial direction of the stator core 10 in the other one of the first half-coil winding and the second half-coil winding are connected in series by the series-connection busbar 33.

More specifically, in FIG. 8, each arrow represents the hairpin 20 in which two leg parts thereof are respectively inserted into two slots spaced apart from each other by a predetermined pitch (p) interval. Further, a U1 coil winding and a U2 coil winding, which are series-connected windings, are shown as a circuit shape connected by arrows. FIG. 8 also shows a lead pin 25 such as the lead pin 25 described above.

In FIG. 8, in order to describe the wire-connection method of the U-phase coil winding, only the wire-connection state of the U-phase coil winding by the hairpin 20 is shown, and the wire-connection states of the V-phase coil winding and the W-phase coil winding by the hairpin are omitted.

Further, FIG. 8 shows a location of a welding point between the two hairpins 20 connected in series in the coil winding and a location of a welding point between the hairpin 20 and the lead pin 25. It is noted that some of the welding point locations are displayed instead of displaying all the welding point locations.

If it is understood that two leg parts of each hairpin 20 are inserted into two slots spaced apart from each other by a predetermined pitch (p) interval, and the hairpins are disposed following the arrow in FIG. 8, a person having ordinary skill in the art should easily recognize the locations of the welding points of the remaining hairpins by referring to FIG. 8.

In FIG. 8, "U1+", "U1−", "U2+", and "U2−" are marked on the slots into which the leg parts of each hairpin for the U-phase coil winding are inserted, and based on the respective slots marked thereon as described above, the leg parts of each hairpin for the V-phase coil winding and the leg parts of each hairpin for the W-phase coil winding are inserted into respective layers of empty slots disposed adjacent to the sides of the marked slots.

However, in FIG. 8, marks of "V1+", "V1−", "V2+", and "V2−", and "W1+", "W1", "W2+", and "W2−" in the empty slots between "U1+" and "U1−" and between "U2+" and "U2−" are omitted, and hairpin connection paths (arrows) therebetween are also omitted.

As described above, in FIG. 8, the wire-connection states of the V-phase coil winding and the W-phase coil winding are omitted. Further, since there is no difference in the wire-connection state of the coil winding and the method thereof for each phase, detailed descriptions of the V-phase coil winding and the W-phase coil winding are also omitted to avoid redundant description.

A person having ordinary skill in the art should easily understand the wire-connection method and the wire-connection state of the V-phase coil winding or the W-phase coil winding according to embodiments of the present disclosure from the wire-connection method of the U-phase coil winding described below.

FIG. 8 shows a total of 48 (n=48) slots disposed in the circumferential direction on the inner circumferential portion of the stator core in the stator assembly of the hairpin winding motor. FIG. 8 is a diagram in which the inner circumferential portion of the stator core is unfolded on a plane, and shows a state in which a total of 48 slots disposed in the actual circumferential direction are virtually disposed on the plane.

In the stator core shown in FIG. 8, the total number of slots (n) is 48. In this specification, for convenience of description, a slot located at the rightmost side in the developed view of FIG. 8 is referred to as a slot 1.

In addition, respective slots are sequentially referred to as a slot 2, a slot 3, a slot 4, . . . a slot i in the order from the slot 1 toward slots on the left side in FIG. 8, and the last slot on the left is referred to as a slot 48 (the total number of slots n=48, the order of the last slot i=48).

As described above, the stator core having a total of 48 slots is shown in FIG. 8, but this is only an example. In embodiments of the present disclosure, the number of slots of the stator core of the hairpin winding motor may be variously changed in consideration of the pitch p of the hairpin winding and the total number of hairpins for the coil windings of the U-phase, the V-phase, and the W-phase.

In FIG. 8, the upward direction is the outer direction of the stator core, and each slot of the stator core has the same number of layers. FIG. 8 shows an embodiment in which each slot has a total of 10 layers. The number of slots is only an example. The number of layers may be changed to another even number, such as six, in some embodiments.

In addition, in the developed view of FIG. 8, the innermost layer of the stator core is referred to as a layer 1, and respective layers are sequentially referred to as a layer 2, a layer 3, . . . , a layer m in order from the layer 1 to the upper side (outwards from each slot).

In the embodiment of FIG. 8, since each slot has a total of 10 layers, the outermost layer of the stator core in FIG. 8 becomes a layer 10, and as described above, the number of layers in each slot may be set to another even number.

In this specification, two layers adjacent to each other inwards and outwards in the radial direction of the stator core in each slot are grouped together and defined as a "set". Therefore, each slot has a total of 5 sets (number of sets I=m/2=5) of layers. In the following description, for convenience, layers 1 and 2 are grouped together and referred to as a set 1.

In this case, layers 3 and 4 are grouped together and referred to as a set 2, layers 5 and 6 are referred to as a set 3, layers 7 and 8 are referred to as a set 4, and layers 9 and 10 are referred to as a set 5.

Further, in FIG. 8, the slot arrangement of one stator core is divided into two developed views for convenience, and the same is only shown in two developed views for convenience in order to clearly illustrate the winding states of the U1 coils and the U2 coils respectively connected in series. The upper developed view and the lower developed view in FIG. 8 show the slot arrangement of the same stator core.

The slot and layer having the same number in the upper and lower developed views in FIG. 8 actually represent the same slot and layer in one stator core.

The upper developed view shows the winding state of the U1 coils wound in series by the hairpin, and the lower developed view separately shows the winding state of the U2 coils wound in series by the hairpin.

In an embodiment, a first half-coil winding (for example, first half-U1 coil winding) and a second half-coil winding (for example, second half-U1 coil winding) of coil windings for each phase include coil windings for each set formed by connecting hairpins in series, the hairpins being respectively inserted into layers in the same set in a plurality of slots.

The coil windings for each set may be connected in series by the coil winding of another neighboring set and a jumper, thereby forming the first half-coil winding and the second half-coil winding.

More specifically, as described above, the U1 coil windings and the U2 coil windings, which may be individual series-connected windings connected in series by a hairpin, may be connected to each other so as to be connected in a parallel wire-connection structure on the side of input terminals ("U1 IN" and "U2 IN") and on the side of output terminals ("U1 OUT" and "U2 OUT"). Accordingly, the U-phase coil winding may have a two-parallel wire-connection structure in which two coil windings connected in series, that is, the U1 coil winding and the U2 coil winding are connected in parallel.

This wire-connection method applies to the V-phase coil winding and the W-phase coil winding in the same manner, except that, among the slots of the stator core, the slot into which the hairpin is inserted is different from that of the U-phase coil winding.

In addition, in the developed view of FIG. 8, the arrow may indicate a direction in which current flows at each hairpin, "U1+" represents the current input side of each hairpin forming the U1 coil windings connected in series, and "U1−" represents the current output side of each hairpin forming the U1 coil windings connected in series.

Similarly, "U2+" represents the current input side of each hairpin forming the U2 coil windings connected in series, and "U2−" represents the current output side of each hairpin forming the U2 coil windings connected in series.

In this case, current flows from "U1+" to "U1−" along each hairpin of the U1 coil winding, and in the same manner, current flows from "U2+" to "U2−" along each hairpin of the U2 coil winding.

The "U1+", the "U1−" and the arrow connecting the "U1+" to the "U1−" correspond to the hairpin of the U1 coil winding, and in the same manner, the "U2+", the "U2−", and the arrow connecting the "U2+" to the "U2−" also correspond to the hairpin of the U2 coil winding.

In the embodiment of FIG. 8, in the case of the U1 coil winding, one end portion of the lead pin (first lead pin 25) inserted into the innermost layer (layer 1) ("U1+") of the predetermined slot (slot 13 in the embodiment of FIG. 8) is determined as a current input terminal ("U1 IN") in which a current input is made to the U1 coil winding.

In this case, the other end portion of the lead pin (first lead pin 25) is welded and connected to one leg part (connected end portion) of another neighboring hairpin 20 inserted into the layer ("U1−") of another slot having a predetermined pitch (for example, p=6)) among the hairpins forming the U1 coil winding.

The slot (slot 19 in the embodiment of FIG. 8) into which one leg part of the neighboring hairpin in the stator core is inserted is a slot spaced apart from the slot (slot 13) into which the lead pin (first lead pin, 25) is inserted by a predetermined pitch (for example, p=6).

In the embodiment of FIG. 8, the layer of the slot into which the lead pin (first lead pin, 25) is inserted is the layer 1 ("U1+") of the slot 13, and the layer of the slot into which the one leg part of the neighboring hairpin 20 is inserted is the layer 2 ("U1−") of the slot 19.

In the case of the neighboring hairpin 20, the one leg part, which is one of the two leg parts, is inserted into the layer 2 ("U1−") of the slot 19, and the other leg part is inserted into the layer 1 ("U1+") of the slot 25.

Additionally, one end portion of a lead pin (second lead pin 25) inserted into the outermost layer (layer 10) ("U1−") of another predetermined slot (slot 7 in the embodiment of FIG. 8) is determined as a current output terminal ("U1 OUT") in which a current output is provided to the U1 coil winding.

In this case, the other end portion of the lead pin (second lead pin, 25) is welded and connected to one leg part (connected end portion) of another neighboring hairpin 20 inserted into the layer ("U1+") of another slot having a predetermined pitch (for example, p=6)) among the hairpins forming the U1 coil winding.

The slot (slot 2 in the embodiment of FIG. 8) into which one leg part of the neighboring hairpin in the stator core is inserted is a slot spaced apart from the slot (slot 7) into which the second lead pin is inserted by a predetermined pitch (for example, p=6).

In the embodiment of FIG. 8, the layer of the slot into which the lead pin (second lead pin, 25) is inserted is the layer 10 ("U1−") of the slot 7, and the layer of the slot into which the one leg part of the neighboring hairpin 20 is inserted is the layer 9 ("U1+") of the slot 1.

In the case of the neighboring hairpin 20, the one leg part, which is one of the two leg parts, is inserted into the layer 9 ("U1+") of the slot 1, and the other leg part is inserted into the layer 10 ("U1−") of the slot 43.

In the embodiment of FIG. 8, in the case of the U2 coil winding, one end portion of a lead pin (third lead pin) inserted into the outermost layer (layer 10) ("U2+") of the predetermined slot (slot 2) is determined as a current input terminal ("U2 IN") in which a current input is made to the U2 coil winding.

In this case, the other end portion of the lead pin (third lead pin) is welded and connected to one leg part (connected end portion) of a neighboring hairpin inserted into the layer ("U2−") of a slot having a predetermined pitch (for example, p=6)) among the hairpins forming the U2 coil winding.

The slot (slot 44 in the embodiment of FIG. 8) into which one leg part of the neighboring hairpin in the stator core is inserted is a slot spaced apart from the slot (slot 2) into which the lead pin (third lead pin) is inserted by a predetermined pitch (for example, p=6).

In the embodiment of FIG. 8, the layer of the slot into which the lead pin (third lead pin) is inserted is the layer 10 ("U2+") of the slot 2, and the layer of the slot into which the one leg part of the neighboring hairpin is inserted is the layer 9 ("U2−") of the slot 9.

In the case of the neighboring hairpin, the one leg part, which is one of the two leg parts, is inserted into the layer 9 ("U2−") of the slot 44, and the other leg part is inserted into the layer 10 ("U2+") of the slot 38.

Additionally, one end portion of a lead pin (fourth lead pin) inserted into the innermost layer (layer 1) ("U2−") of another predetermined slot (slot 8 in the embodiment of FIG. 8) is determined as a current output terminal ("U2 OUT") in which a current output is provided to the U2 coil winding.

In this case, the other end portion of the lead pin (fourth lead pin) is welded and connected to one leg part (connected end portion) of a neighboring hairpin inserted into the layer ("U2+") of a slot having a predetermined pitch (for example, p=6)) among the hairpins forming the U2 coil winding.

The slot (slot 14 in the embodiment of FIG. 8) into which one leg part of the neighboring hairpin in the stator core is inserted is a slot spaced apart from the slot (slot 8) into which the fourth lead pin is inserted by a predetermined pitch (for example, p=6).

In the embodiment of FIG. 8, the layer of the slot into which the lead pin (fourth lead pin) is inserted is the layer 1 ("U2−") of the slot 8, and the layer of the slot into which the one leg part of the neighboring hairpin is inserted is the layer 2 ("U2+") of the slot 14.

In the case of the neighboring hairpin, the one leg part, which is one of the two leg parts, is inserted into the layer 2 ("U2+") of the slot 14, and the other leg part is inserted into the layer 1 ("U2−") of the slot 20.

As described above, in an embodiment of the present disclosure, the current input terminal and the current output terminal of the U1 coil winding and the current input terminal and the current output terminal of the U2 coil winding are formed by the lead pin 25.

Furthermore, in order to achieve the parallel wire-connection of the U1 coil winding and the U2 coil winding, the current input terminal ("U1 IN") of the U1 coil winding and the current input terminal ("U2 IN") of the U2 coil winding may be connected to each other so as to be connected to an input terminal part, the current output terminal ("U1 OUT") of the U1 coil winding and the current output terminal ("U2 OUT") of the U2 coil winding may be connected to each other so as to be connected to an output terminal part, and the input terminal part and the output terminal part may be respectively connected to an inverter-side circuit through a busbar (e.g., the crossbar 31 in FIG. 6) of a terminal assembly (e.g., the terminal assembly 30 in FIG. 6).

Additionally, as shown in FIG. 8, in an embodiment, one leg part of each hairpin for the U1 coil winding is inserted into the inner layer of the two layers of each set, and the other leg part of each hairpin for the U1 coil winding is inserted into the remaining outer layer of the two layers of each set.

In this manner, in the U1 coil winding formed by a plurality of hairpins connected in series, two leg parts of each hairpin are respectively inserted into two slots spaced apart from each other by a predetermined pitch (for example, p=6) interval, and in this case, the two leg parts of each hairpin are inserted into different layers in the same set.

In the same manner, one leg part of each hairpin for the U2 coil winding may be inserted into the inner layer of the two layers of each set, and the other leg part of each hairpin for the U2 coil winding may be inserted into the remaining outer layer of the two layers of each set.

In the case of the U2 coil winding formed by a plurality of hairpins connected in series, two leg parts of each hairpin are inserted into two slots spaced apart from each other by a predetermined pitch (for example, p=6) interval, and in this case, the two leg parts of each hairpin are inserted into different layers in the same set Referring still to FIG. 8, the pitch p of the U-phase coil winding is set to 6, in the illustrated embodiment. In this embodiment, the hairpins and the lead pins of the U1 coil winding and the U2 coil winding are all inserted into and connected to the slots spaced apart from each other by a six-pitch interval.

Referring to the upper developed view in FIG. 8, the first lead pin inserted into the layer 1 ("U1+") of the slot 13 is set to "U1 IN", which is the current input terminal of the U1 coil winding, and in this case, as indicated by the arrow, the first lead pin is connected to the hairpin inserted into the layer 2 ("U1−") of the slot 19. Thereafter, in the set 1, the leg parts of each hairpin are connected to each other while being inserted into the slots spaced apart from each other by a six-pitch interval.

In an embodiment of the present disclosure, coil winding is performed as a method of welding the leg parts of two adjacent hairpins in the same set. As described above, in the set 1, the first lead pin is connected to the hairpin in the set 1 of the U1 coil winding, and the two leg parts of each hairpin in the set 1 are welded and connected in a state of being inserted into the slots spaced apart from each other by a predetermined pitch (for example, six pitches) interval (as illustrated in the upper developed view in FIG. 8).

In addition to the set 1, in the case of the rest of the sets as well, such as the set 2 and the set 3, the U1 coil winding is formed by welding and connecting two leg parts of each hairpin in the same set in a state in which the two leg parts are inserted into the slots spaced apart from each other by a predetermined pitch (for example, p=6) interval.

Further, in the set 1, the first lead pin is connected to the first hairpin of the U1 coil winding, and the leg parts of two adjacent hairpins are welded and connected in series in a state in which the two leg parts of each hairpin in the set 1 are inserted into different layers in the slots spaced apart from each other by a predetermined pitch interval.

In addition to the set 1, in the case of the rest of the sets as well, such as the set 2 and the set 3, the leg parts of two adjacent hairpins are welded and connected in series in a state in which the two leg parts of each hairpin in the same set are inserted into different layers in the slots spaced apart from each other by a predetermined pitch interval.

Additionally, a lead pin is inserted into a slot in the last order among slots spaced apart from each other by a predetermined pitch interval in each set, and a leg part of a hairpin inserted into a slot immediately before the last one may be connected to one end portion of the lead pin by welding.

Then, in the next set, a lead pin is inserted into the first slot, and one end portion of the lead pin of the first slot is connected to the other end portion of the lead pin inserted into the last slot in the previous set through the jumpers 26, 27, and 28 serving as conductive members, thereby forming the first half-U1 coil winding.

In addition, starting from the set 1 again, the second half-U1 coil winding is formed. The second half-U1 coil winding may start from a slot directly adjacent to the slot of the first order of the set 1 in which the first half-U1 coil winding begins.

In the upper developed view of FIG. 8, the first half-U1 coil winding starts from the layer 1 of the slot 13 and the lead pin inserted thereinto, and the second half-U1 coil winding starts from the layer 1 of the slot 14 directly adjacent to the slot 13 and a lead pin inserted thereinto.

In addition, the second half-U1 coil winding ends in a slot directly adjacent to the last slot of the set 5 in which the first half-U1 coil winding ends. Since the first half-U1 coil winding ends at the layer 10 of the slot 7 and the lead pin inserted thereinto, the second half-U1 coil winding ends at the layer 10 of the slot 8 directly adjacent to the slot 7 and a lead pin inserted thereinto.

The lead pin inserted into the first slot of the set 1 in which the first half-U1 coil winding starts becomes "U1 IN", which is the current input terminal of the U1 coil winding, and the lead pin inserted into the last slot of the set 5 in which the second half-U1 coil winding ends becomes "UN OUT", which is the current output terminal of the U1 coil winding.

The second half-U1 coil winding may also formed by performing coil winding in the same way as forming the first half-U1 coil winding. The lead pin inserted into the first slot in each set, a plurality of hairpins having leg parts respectively inserted into a slot in the next order, the slot being spaced apart from the first slot by a predetermined pitch (for example, p=6) interval, and the lead pin inserted into the last slot may all be connected in series, thereby forming a coil winding of the corresponding set.

Furthermore, in an embodiment, a lead pin inserted into the last slot in the previous sequential set is connected to a lead pin inserted into the first slot in the next set using the jumpers 26, 27, and 28.

Then, when the second half-U1 coil winding is completed, the lead pin 25 inserted into the last slot of the last set in the first half-U1 coil winding is connected to the lead pin 25 inserted into the first slot of the first set in the second half-U1 coil winding using the series-connection busbar 33 of the terminal assembly (e.g., the terminal assembly 30 in FIG. 6)

As a result, it is possible to form the U1 coil winding by connecting the first half-U1 coil winding to the second half-U1 coil winding in series through the series-connection busbar 33, and similarly, it is possible to form the U2 coil winding by connecting the first half-U2 coil winding to the second half-U2 coil winding, which are obtained by performing the winding in the same manner, in series using the series-connection busbar in the same manner.

As described above, in embodiments of the present disclosure, the jumpers 26, 27, and 28 are used to connect coil windings between different sets in forming the U1 coil winding and the U2 coil winding, and the series-connection busbar 33 is used to connect the first half-coil winding to the second half-coil winding in series in the U1 coil winding and the U2 coil winding, respectively.

According to embodiments of the present disclosure, in order to connect the coil windings of the set, a total of three types of jumpers 26, 27, and 28 may be used to connect lead pins respectively inserted into two slots spaced apart from each other by a y-pitch interval, two slots spaced apart from each other by a (y−1)-pitch interval, and two slots spaced apart from each other by a (y+1)-pitch interval.

In the embodiment of FIG. 8, y may be a pitch p, which is an interval between two slots into which two leg parts of each hairpin 20 are respectively inserted (y=p). Accordingly, in the embodiment of FIG. 8, the jumpers 26, 27, and 28 respectively having pitches of p, p−1, and p+1 may be used.

According to embodiments of the present disclosure, the jumper 27 having the y-pitch and the jumper having the p-pitch are jumpers capable of connecting two conductors, i.e., two lead pins respectively inserted into slots spaced apart from each other by the y-pitch interval and the p-pitch interval. Similarly, the jumper 26 having the (y−1)-pitch and the jumper having the (p−1)-pitch are jumpers capable of connecting two conductors respectively inserted into slots spaced apart from each other by the (y−1)-pitch interval and the (p−1)-pitch interval. In addition, the jumper 28 having the (y+1)-pitch and the jumper having the (p+1)-pitch are jumpers capable of connecting two conductors respectively inserted into slots spaced apart from each other by the (y+1)-pitch interval and the (p+1)-pitch interval.

In the embodiment of FIG. 8, the pitch p of the hairpin winding is 6, and in this case, the jumper 26 having a five-pitch, the jumper 27 having a six-pitch, and the jumper 28 having a seven-pitch are used. Specifically, in the embodiment of FIG. 8, one jumper 26 having a five-pitch, six jumpers 27 having a six-pitch, and one jumper 28 having a seven-pitch are used in both the U1 coil winding and the U2 coil winding.

In an embodiment, one jumper 28 having a seven-pitch may be used to connect the coil windings of the set 2 to the coil windings of the set 3 in the first half-U1 coil winding, and one jumper 26 having a five-pitch may be used to connect the coil windings of the set 2 to the coil windings of the set 3 in the second half-U1 coil winding. In this case, the jumper 27 having a six-pitch may be used to connect the remaining two sets of coil windings among the U1 coil windings.

Similarly, one jumper 28 having a seven-pitch may be used to connect the coil windings of the set 3 to the coil windings of the set 2 in the first half-U2 coil winding, and one jumper 26 having a five-pitch may be used to connect the coil windings of the set 3 to the coil windings of the set 2 in the second half-U2 coil winding. In this case, the jumper 27 having a six-pitch may be used to connect the remaining two sets of coil windings among the U2 coil windings.

As described above, in the first half-U1 coil, the second half-U1 coil, the first half-U2 coil, and the second half-U2 coil, the jumper 26 having a (y−1)-pitch, and the jumper 28 having a (y+1)-pitch may be used to connect the coil windings between the sets in the middle order, and the jumper 27 having a y-pitch is used between the coil windings between the remaining sets.

When a jumper is used to connect the sets on both sides with, a portion of the coil winding connected by the jumper in the sets of both sides to be connected may be a lead pin, which is one of the conductors, as described above, or the same may not be a lead pin but a hairpin of both sets. Additionally, y used to classify and define the jumper and p, which is a pitch of a hairpin, may have a relationship of "y=p".

In an embodiment, the series-connection busbar 33 may be used in common. For example, a series-connection busbar having the same pitch may be used in the U1 coil winding and the U2 coil winding. In this case, in both the U1 coil winding and the U2 coil winding, it is possible to use the series-connection busbar 33 having a p-pitch configured to connect lead pins respectively inserted into two slots spaced apart from each other by a p-pitch interval, which is a pitch of a hairpin winding.

In the embodiment of FIG. 8, in the case of the U1 coil winding, as shown in the upper developed view, the series-connection busbar 33 having a six-pitch jumps and connects lead pins on both sides from the layer 10 of the slot 8 to the layer 1 of the slot 14 (six-pitch interval between the slot 8 and the slot 14).

In the case of the U2 coil winding, as shown in the lower developed view, the series-connection busbar 33 having a six-pitch jumps and connects lead pins on both sides from the layer 1 of the slot 7 to the layer 10 of the slot 1 (six-pitch interval between the slot 7 and the slot 1).

Referring to the upper developed view in FIG. 8, the U1 coil winding is described in more detail below. In the set 1, a first lead pin inserted into the layer 1 ("U1+") of the slot

13, a hairpin having two leg parts respectively inserted into the layer 2 ("U1−") of the slot 19 and the layer 1 ("U1+") of the slot 25, a hairpin having two leg parts respectively inserted into the layer 2 ("U1−") of the slot 31 and the layer 1 ("U1+") of the slot 37, a hairpin having two leg parts respectively inserted into the layer 2 ("U1−") of the slot 43 and the layer 1 ("U1+") of the slot 1, and a separate lead pin inserted into the layer 2 ("U1−") of the slot 7 are all connected in series, thereby forming coil windings connected in series of the set 1.

In the coil windings connected in series of the set 1, the first lead pin inserted into the layer 1 ("U1+") of the slot 13 is welded and connected to one leg part of the hairpin inserted into the layer 2 ("U1−") of the slot 19, and the other leg part of the hairpin inserted into the layer 1 ("U1+") of the slot 25 is welded and connected to one leg part of the hairpin inserted into the layer 2 ("U1−") of the slot 31.

In addition, the hairpin having one leg part inserted into the layer 2 of the slot 31 has the other leg part thereof inserted into the layer 1 of the slot 37, and the other leg part inserted into the layer 1 of the slot 37 is welded and connected to one leg part of the hairpin inserted into the layer 2 of the slot 43.

Furthermore, the hairpin having one leg part inserted into the layer 2 of the slot 43 has the other leg part thereof inserted into the layer 1 of the slot 1, and the other leg part of the hairpin inserted into the layer 1 of the slot 1 is welded and connected to one end portion of a lead pin inserted into the layer 2 of the slot 7.

The other end portion of the lead pin inserted into the layer 2 of the slot 7 is connected to one end portion of a lead pin inserted into the layer 3 of the slot 13 among the coil windings connected in series of the set 2 through the jumper 27 having a six-pitch (y-pitch).

In the coil windings connected in series of the set 2, the other end portion of the lead pin inserted into the layer 3 of the slot 13 is welded and connected to one leg part of a hairpin inserted into the layer 4 of the slot 19, and the other leg part of the hairpin having one leg part inserted into the layer 4 of the slot 19 is inserted into the layer 3 of the slot 25.

In this manner, when a plurality of hairpins, a lead pin, a jumper, a lead pin, and a plurality of hairpins are connected in series in this order to form the first half-U1 coil winding, the lead pin in the last order of the first half-U1 coil winding may be connected to the lead pin in the first order of the second half-U1 coil winding using the series-connection busbar 33 having a six-pitch. For example, one end portion of the lead pin inserted into the layer 10 of the slot 8 is connected to one end portion of the lead pin inserted into the layer 1 of the slot 14, in an embodiment.

In the case of the second half-U1 coil winding, again in the set 1, the lead pin inserted into the layer 1 ("U1+") of the slot 14, a hairpin having two leg parts respectively inserted into the layer 2 ("U1−") of the slot 20 and the layer 1 ("U1+") of the slot 26, a hairpin having two leg parts respectively inserted into the layer 2 ("U1−") of the slot 32 and the layer 1 ("U1+") of the slot 38, a hairpin having two leg parts respectively inserted into the layer 2 ("U1−") of the slot 44 and the layer 1 ("U1+") of the slot 2, and a separate lead pin inserted into the layer 2 ("U1−") of the slot 8 are all connected in series, thereby forming coil windings connected in series of the set 1.

In the coil windings connected in series of the set 1, the lead pin inserted into the layer 1 ("U1+") of the slot 14 is welded and connected to one leg part of the hairpin inserted into the layer 2 ("U1−") of the slot 20, and the other leg part of the hairpin inserted into the layer 1 ("U1+") of the slot 26 is welded and connected to one leg part of the hairpin inserted into the layer 2 ("U1−") of the slot 32.

In addition, the hairpin having one leg part inserted into the layer 2 of the slot 32 has the other leg part thereof inserted into the layer 1 of the slot 38, and the other leg part inserted into the layer 1 of the slot 38 is welded and connected to one leg part of the hairpin inserted into the layer 2 of the slot 44.

Furthermore, the hairpin having one leg part inserted into the layer 2 of the slot 44 has the other leg part thereof inserted into the layer 1 of the slot 2, and the other leg part of the hairpin inserted into the layer 1 of the slot 2 is welded and connected to one end portion of a lead pin inserted into the layer 2 of the slot 8.

The other end portion of the lead pin inserted into the layer 2 of the slot 8 is connected to one end portion of a lead pin inserted into the layer 3 of the slot 14 among the coil windings connected in series of the set 2 through the jumper 27 having a six-pitch (y-pitch).

In the coil windings connected in series of the set 2, the other end portion of the lead pin inserted into the layer 3 of the slot 14 is welded and connected to one leg part of a hairpin inserted into the layer 4 of the slot 20, and the other leg part of the hairpin having one leg part inserted into the layer 4 of the slot 20 is inserted into the layer 3 of the slot 26.

In this manner, when a plurality of hairpins, a lead pin, a jumper, a lead pin, and a plurality of hairpins are repeatedly connected in this order, the coil windings connected in series of the set 2, the set 3, the set 4, and the set 5 may be formed, and finally, the second half-U1 coil winding may be formed. Further, it is possible to form a final U1 coil winding in which the first half-U1 coil winding and the second half-U1 coil winding are connected by the series-connection busbar 33 having a six-pitch.

As described above, in the case of the U1 coil winding, the winding starts from the inner layer of the stator core and ends at the outer layer thereof. On the other hand, the U2 coil winding is different from the U1 coil winding in that the U2 coil winding has a wire-connection structure in which the winding starts from the outer layer of the stator core and ends at the inner layer thereof.

However, in an embodiment, the method of forming the U2 coil winding using a hairpin, a lead pin, a jumper, and a series-connection busbar is generally the same as the method of forming the U1 coil winding. A more detailed description of the method of forming the U2 coil winding is therefore omitted.

Figure 9:
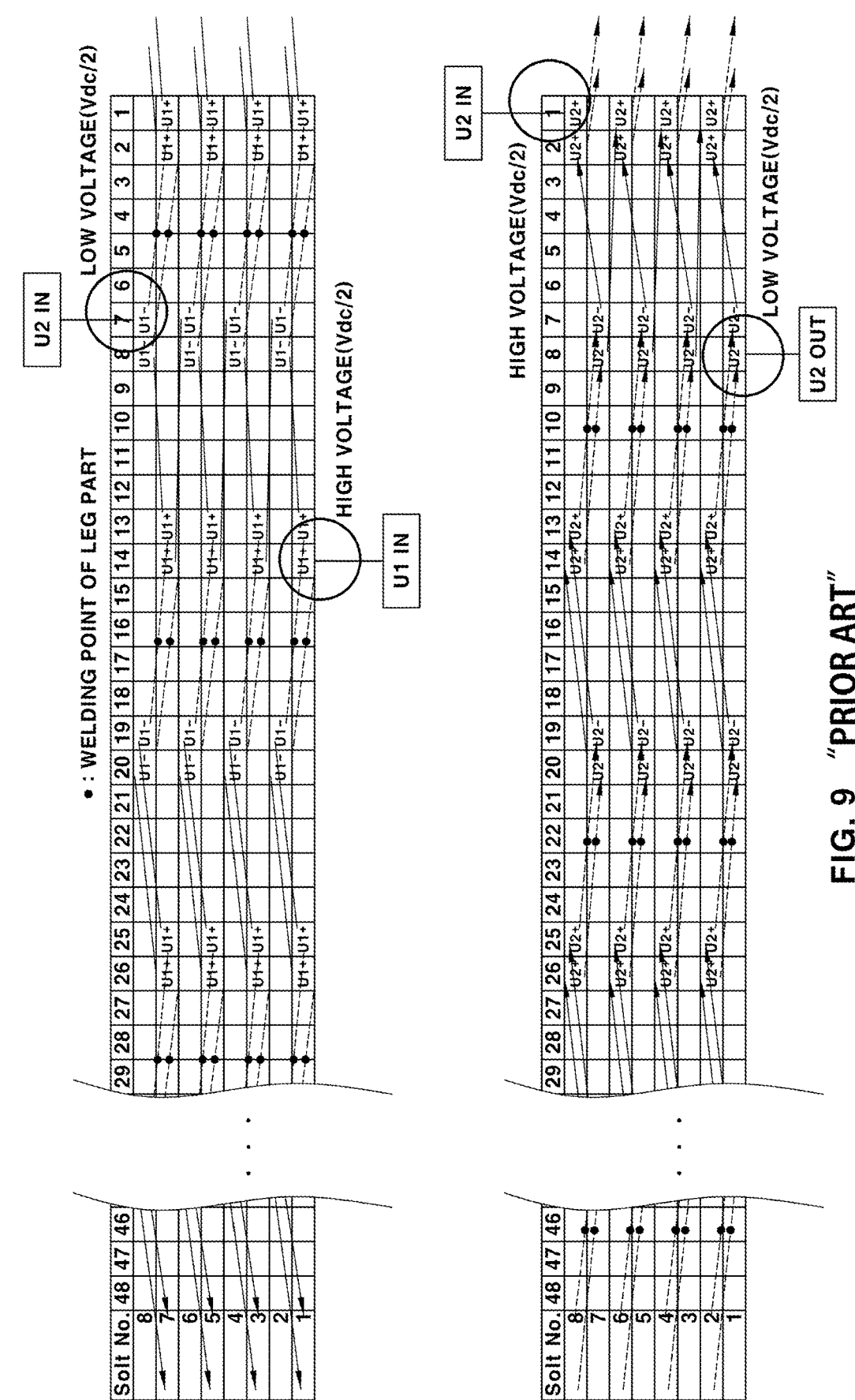
FIG. 9 is a developed view of a winding connection showing a known method of winding a stator coil.

FIG. 9 is a developed view of a winding connection showing a known stator coil winding method. As described above, according to the known stator coil winding method, it may be seen that a large voltage difference between coils having the same phase occurs.

The example shown in FIG. 9 does not use a series-connection busbar configured to electrically jump and connect a coil of the outermost layer in the radial direction of a specific slot in each coil of each phase to a coil of the innermost layer in the radial direction of the other slot adjacent to the specific slot.

Figure 10:
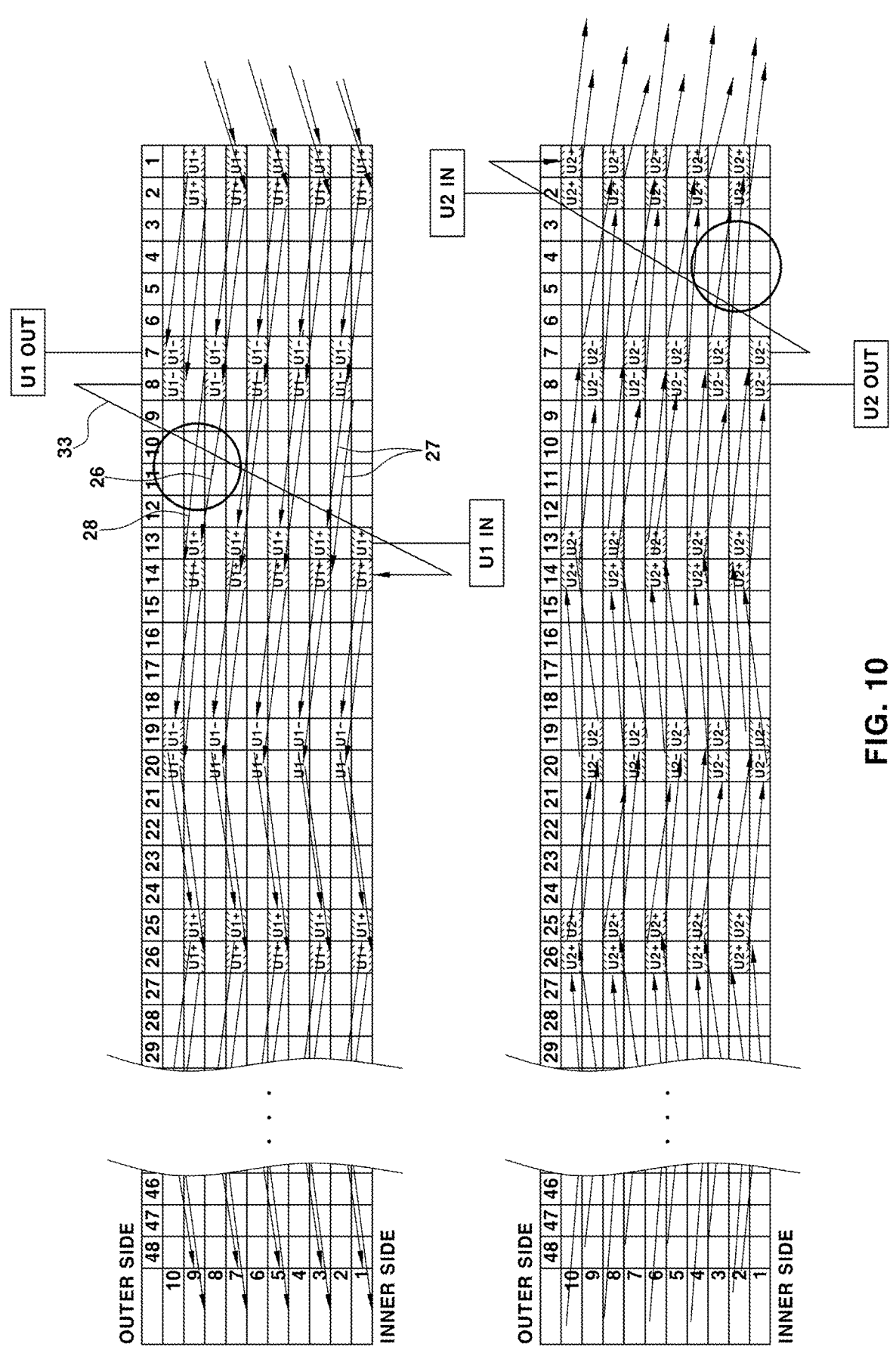
FIG. 10 is a developed view of a winding connection showing a method of winding a stator coil of a hairpin winding motor, according to another embodiment of the present disclosure.

FIG. 10 is a developed view of a winding connection showing a method of winding a stator coil of a hairpin winding motor, according to another embodiment of the present disclosure. In the embodiment of FIG. 10, a layer used for jump connection is different from that of the embodiment in FIG. 8.

Particularly, in the embodiment of FIG. 10, a layer of a slot in which the jumper 26 having a five-pitch and the jumper 28 having a 7-pitch are used is different from that of the embodiment in FIG. 8. However, the two embodiments may generally be the same in terms of a method of winding a stator coil using a hairpin except that only a portion and a location of the jumper to be used are different.

Further, in the embodiment of FIG. 10, one jumper 26 having a five-pitch, six jumpers 27 having a six-pitch, one jumper 28 having a seven-pitch, and one series-connection busbar 33 having a six-pitch are used in both the U1 coil winding and the U2 coil winding.

In the embodiment of FIG. 10, as in the embodiment of FIG. 8, it is possible to reduce a voltage difference between coils having the same phase in the same slot in a stator coil winding part and to achieve optimization of winding insulation.

As is apparent from the above description, embodiments of the present disclosure provide a stator assembly, a hairpin winding motor including the same, and a method of winding a stator coil of a hairpin winding motor, configured to achieve optimization of winding insulation capable of responding to a voltage difference between coils in a slot (between the same phases).

Particularly, application of an open-end winding (OEW) type provides a winding structure optimized to reduce a voltage difference between the same phases of coils in the same slot, thereby making it possible to solve problems such as an increase in height of an end coil and a decrease in mass productivity.

In addition, it is possible to solve a problem related to excessive use of an insulating material configured to respond to an increase in voltage difference between coils in the same slot. Further, it is also possible to solve problems such as a decrease in the space factor of a coil, a decrease in mass productivity, and an increase in price due to excessive use of an insulating material.

Although some embodiments of the present disclosure have been described in detail above, the scope of the present disclosure is not limited thereto. Various modifications and improvements made by those having ordinary skill in the art using technical concepts of the present disclosure defined in the following claims are also included in the scope of the present disclosure.

What is claimed is:

1. A stator assembly, comprising:

a stator core having a plurality of slots formed in a circumferential direction thereof, wherein the plurality of slots is disposed on an inner circumferential portion of the stator core; and a coil winding part having hairpins respectively inserted into the plurality of slots, wherein the hairpins are connected in series to form a coil for each of a U-phase, a V-phase, and a W-phase, wherein:

each slot of the plurality of slots has a space partitioned into a plurality of layers arranged in a radial direction of the stator core, the coil for each of the U-phase, the V-phase, and the W-phase comprises a first half-coil winding and a second half-coil winding formed by connecting the respective hairpins in series, two layers adjacent to each other inwards and outwards in the radial direction of the stator core in each slot are defined as a set, the first half-coil winding and the second half-coil winding of the coil of each phase comprise coil windings for the respective sets formed by connecting in series the hairpins respectively inserted into the layers in the same set in the plurality of slots, and the coil windings for the respective sets are connected in series with a coil winding of another neighboring set by a jumper to form the first half-coil winding and the second half-coil winding, and wherein the jumper comprises:

a first jumper having a y-pitch interval, wherein the jumper connects the coil windings of different sets wound in the two slots spaced apart from each other by the y-pitch interval in the circumferential direction of the stator core, a second jumper having a (y−1)-pitch interval, wherein the jumper connects the coil windings of different sets wound in the two slots spaced apart from each other by the (y−1)-pitch interval in the circumferential direction of the stator core, and a third jumper having a (y+1)-pitch interval, wherein the jumper connects the coil windings of different sets wound in the two slots spaced apart from each other by the (y+1)-pitch interval in the circumferential direction of the stator core.

2. The stator assembly of claim 1, wherein:

two leg parts of each hairpin forming the coil for each phase are respectively inserted into different layers in the same set of two slots spaced apart from each other by a predetermined pitch (p) interval in the circumferential direction of the stator core.

3. The stator assembly of claim 1, wherein the y-pitch interval is set equal to the pitch (p) interval between the slots having the two leg parts of each hairpin forming the coil for each phase inserted thereinto.

4. The stator assembly of claim 1, wherein:

the stator core has a total of 48 slots arranged in the circumferential direction thereof and formed on the inner circumferential portion thereof, the two leg parts of each hairpin forming the coil for each phase are respectively inserted into the slots spaced apart from each other by six-pitch (p) interval, and the jumper comprises a jumper having a five-pitch interval, a jumper having a six-pitch interval, and a jumper having a seven-pitch interval.

5. The stator assembly of claim 1, wherein the coil for each phase has a two-parallel wire-connection structure formed by connecting two coil windings in parallel using a terminal assembly, wherein the two coil windings are formed by connecting the first half-coil winding to the second half-coil winding in series using the conductive member.

6. The stator assembly of claim 1, wherein:

the first half-coil winding and the second half-coil winding are formed by connecting the respective hairpins in series between an outermost layer and an innermost layer in the radial direction of the stator core, and in the first half-coil winding and the second half-coil winding, a coil end portion disposed in the outermost layer in the radial direction of the stator core in one of the first half-coil winding and the second half-coil winding and a coil end portion disposed in the innermost layer in the radial direction of the stator core in the other one of the first half-coil winding and the second half-coil winding are connected in series by a conductive member.

7. A hairpin winding motor comprising a stator assembly, wherein the stator assembly comprises:

a stator core having a plurality of slots formed in a circumferential direction thereof, wherein the plurality of slots is disposed on an inner circumferential portion of the stator core; and a coil winding part having hairpins respectively inserted into the plurality of slots of the stator core, wherein the hairpins are connected in series to form a coil for each of a U-phase, a V-phase, and a W-phase, wherein:

each of the plurality of slots has a space partitioned into a plurality of layers arranged in a radial direction of the stator core, the coil for each of the U-phase, the V-phase, and the W-phase comprises a first half-coil winding and a second half-coil winding formed by connecting the respective hairpins in series, two layers adjacent to each other inwards and outwards in the radial direction of the stator core in each slot are defined as a set, the first half-coil winding and the second half-coil winding of the coil of each phase comprise coil windings for the respective sets formed by connecting in series the hairpins respectively inserted into the layers in the same set in the plurality of slots, the coil windings for the respective sets are connected in series with a coil winding of another neighboring set by a jumper to form the first half-coil winding and the second half-coil winding, and wherein the jumper comprises:

a first jumper having a y-pitch interval, wherein the first jumper connects the coil windings of different sets wound in the two slots spaced apart from each other by the y-pitch interval in the circumferential direction of the stator core, a second jumper having a (y−1)-pitch interval, wherein the second jumper connects the coil windings of different sets wound in the two slots spaced apart from each other by the (y−1)-pitch interval in the circumferential direction of the stator core, and a third jumper having a (y+1)-pitch interval, wherein the third jumper connects the coil windings of different sets wound in the two slots spaced apart from each other by the (y+1)-pitch interval in the circumferential direction of the stator core.

8. The hairpin winding motor of claim 7, wherein:

two leg parts of each hairpin forming the coil for each phase are respectively inserted into different layers in the same set of two slots spaced apart from each other by a predetermined pitch (p) interval in the circumferential direction of the stator core.

9. The hairpin winding motor of claim 7, wherein the y-pitch interval is set equal to the pitch (p) interval between the slots having the two leg parts of each hairpin forming the coil for each phase inserted thereinto.

10. The hairpin winding motor of claim 9, wherein the conductive member connects the coil end portion of the first half-coil winding to the coil end portion of the second half-coil winding, wherein the coil end portions are respectively inserted into the two slots spaced apart from each other by the y-pitch interval.

11. The hairpin winding motor of claim 7, wherein the coil for each phase has a two-parallel wire-connection structure formed by connecting two coil windings in parallel using a terminal assembly, wherein the two coil windings are formed by connecting the first half-coil winding to the second half-coil winding in series using the conductive member.

12. The hairpin winding motor of claim 7, wherein:
the first half-coil winding and the second half-coil winding are formed by connecting the respective hairpins in series between an outermost layer and an innermost layer in the radial direction of the stator core, and
in the first half-coil winding and the second half-coil winding, a coil end portion disposed in the outermost layer in the radial direction of the stator core in one of the first half-coil winding and the second half-coil winding and a coil end portion disposed in the innermost layer in the radial direction of the stator core in the other one of the first half-coil winding and the second half-coil winding are connected in series by a conductive member.

13. A method of winding a stator coil of a hairpin winding motor, the method comprising:
providing a stator core having a plurality of slots formed in a circumferential direction thereof, wherein the plurality of slots is disposed on an inner circumferential portion of the stator core;
partitioning a space in each slot of the plurality of slots into a plurality of layers arranged in a radial direction of the stator core; and
respectively inserting hairpins into the plurality of slots of the stator core, and performing stator coil winding to connect the hairpins inserted thereinto in series to form a coil for each of a U-phase, a V-phase, and a W-phase, wherein:
the coil for each of the U-phase, the V-phase, and the W-phase comprises a first half-coil winding and a second half-coil winding formed by connecting the respective hairpins in series,
two layers adjacent to each other inwards and outwards in the radial direction of the stator core in each slot are defined as a set,
the first half-coil winding and the second half-coil winding of the coil of each phase comprise coil windings for the respective sets formed by connecting in series the hairpins respectively inserted into the layers in the same set in the plurality of slots, and
he coil windings for the respective sets are connected in series with a coil winding of another neighboring set by a jumper to form the first half-coil winding and the second half-coil winding, and wherein the jumper comprises:
a first jumper having a y-pitch interval, wherein the jumper connects the coil windings of different sets wound in the two slots spaced apart from each other by the y-pitch interval in the circumferential direction of the stator core,
a second jumper having a (y−1)-pitch interval, wherein the jumper connects the coil windings of different sets wound in the two slots spaced apart from each other by the (y−1)-pitch interval in the circumferential direction of the stator core, and
a third jumper having a (y+1)-pitch interval, wherein the jumper connects the coil windings of different sets wound in the two slots spaced apart from each other by the (y+1)-pitch interval in the circumferential direction of the stator core.

14. The method of claim 13, wherein:
two leg parts of each hairpin forming the coil for each phase are respectively inserted into different layers in the same set of two slots spaced apart from each other by a predetermined pitch (p) interval in the circumferential direction of the stator core.

15. The method of claim 13, wherein the y-pitch interval is set equal to the pitch (p) interval between the slots having the two leg parts of each hairpin forming the coil for each phase inserted thereinto.

16. The method of claim 13, wherein the coil for each phase forms a two-parallel wire-connection structure by connecting two coil windings in parallel using a terminal assembly, wherein the two coil windings are formed by connecting the first half-coil winding to the second half-coil winding in series using the conductive member.

17. The method of claim 13, wherein:
the first half-coil winding and the second half-coil winding are formed by connecting the respective hairpins in series between an outermost layer and an innermost layer in the radial direction of the stator core, and
in the first half-coil winding and the second half-coil winding, a coil end portion disposed in the outermost layer in the radial direction of the stator core in one of the first half-coil winding and the second half-coil winding and a coil end portion disposed in the innermost layer in the radial direction of the stator core in the other one of the first half-coil winding and the second half-coil winding are connected in series by a conductive member.

* * * * *